United States Patent [19]

Carpenter et al.

[11] Patent Number: 5,311,601
[45] Date of Patent: May 10, 1994

[54] HIERARCHICAL PATTERN RECOGNITION SYSTEM WITH VARIABLE SELECTION WEIGHTS

[75] Inventors: Gail A. Carpenter; Stephen Grossberg, both of Newton, Mass.

[73] Assignee: Trustees of Boston University, Boston, Mass.

[21] Appl. No.: 761,759

[22] PCT Filed: Jan. 11, 1991

[86] PCT No.: PCT/US91/00261

§ 371 Date: Nov. 4, 1991

§ 102(e) Date: Nov. 4, 1991

Related U.S. Application Data

[63] Continuation-in-part of Ser. No. 464,247, Jan. 12, 1990, abandoned.

[51] Int. Cl.⁵ .................... G06K 9/62; G06K 9/00
[52] U.S. Cl. .................................. 382/15; 382/10; 395/23; 395/24
[58] Field of Search ............... 382/14, 15, 37, 38, 382/10, 1; 364/513; 395/21, 23, 24

[56] References Cited

U.S. PATENT DOCUMENTS 4,914,704  4/1990  Carpenter et al. .................. 382/14

FOREIGN PATENT DOCUMENTS

WO88/10476  12/1988  European Pat. Off. ...... G06K 9/66

OTHER PUBLICATIONS

Cohen et a.,, "Speech Perception and Production By A Self-Organizing Neural Network," In *In Evolution, Learning. Cognition and Advanced Architecture*, Y. C. Lee (Ed), Hong Kong: World Scientific Publishers, 1988.

Carpenter et al., "Search mechanisms for Adaptive Resonance Theory (ART) Architectures," IJCNN International Joint Conference on Neural Networks, Sheraton Washington Hotel, Jun. 19-22, 1989, pp. 201-205 (see whole document).

B. Kosko, "Competitive Adaptive Bidirectional Associative Memories," IEEE First International Conference on Neural Networks, San Diego, Calif., Jun. 21-24, 1987, pp. II-759-II-766.

Carpenter et al., "ART 3: Hierarchical Search Using Chemical Transmitters in Self-Organizing pattern Recognition Architectures", Neural Networks, vol. 3, No. 2, 1990, pp. 129-152.

G. A. Carpenter & S. Grossberg, "ART 2: Self-Organization of Stable Category Recognition Codes for Analog Input Patterns" *Applied Optics*, Dec. 1, 1987, pp. 4919-4930.

G. A. Carpenter 7 S. Grossberg, "The ART of Adaptive Pattern Recognition by a Self-Organizing Neural Network", IEEE, *Computer*, vol. 21, No. 3, pp. 77-88, Mar. 1988.

*Primary Examiner*—David K. Moore
*Assistant Examiner*—Michael Cammarata
*Attorney, Agent, or Firm*—Hamilton, Brook, Smith & Reynolds

[57] ABSTRACT

In a pattern recognition system, input signals are applied to a short term feature representation field of nodes. A pattern from the short term feature representation field selects at least one category node in a category representation field. The selected category then generates a template pattern. With an insufficient match between the input pattern and template pattern, the category selection is reset. Category selection is based on selection weights which are initially set equal to long term memory weights. After reset, however, selections weights are reduced. Reduction is greatest at those nodes where excitation in $F_2$ was greater prior to reset. The category representation field is of the same form as the field which receives the input and may itself serve as an input to a higher level pattern recognition system.

26 Claims, 21 Drawing Sheets

HIERARCHICAL PATTERN RECOGNITION SYSTEM WITH VARIABLE SELECTION WEIGHTS

This research was supported in part by the Air Force Office of Scientific Research (AFOSR F49620-86-C-0037 and AFOSR F49620-87-C-0018), the Army Research Office (ARO DAAL03-88-K-0088), and the National Science Foundation (NSF DMS-86-11959 and IRI-87-16960). The U.S. Government has certain rights to the invention.

This application is a continuation-in-part (CIP) of application Ser. No. 07/464,247, filed Jan. 12, 1990, and now abandoned.

BACKGROUND OF THE INVENTION

Adaptive Resonance Theory (ART) architectures are neural networks that carry out stable self-organization of recognition codes for arbitrary sequences of input patterns. Adaptive Resonance Theory first emerged from an analysis of the instabilities inherent in feedforward adaptive coding structures (Grossberg, 1976a). More recent work has led to the development of two classes of ART neural network architectures, specified as systems of differential equations. The first class, ART 1, self-organizes recognition categories for arbitrary sequences of binary input patterns (Carpenter and Grossberg, 1987a and U.S. patent application Ser. No. 07/086,732, filed Jul. 23, 1987). A second class, ART 2, does the same for either binary or analog inputs (Carpenter and Grossberg, 1987b and U.S. Pat. No. 4,914,708).

Both ART 1 and ART 2 use a maximally compressed, or choice, pattern recognition code. Such a code is a limiting case of the partially compressed recognition codes that are typically used in explanations by ART of biological data (Grossberg, 1982a, 1987). Partially compressed recognition codes have been mathematically analysed in models for competitive learning, also called self-organizing feature maps, which are incorporated into ART models as part of their bottom-up dynamics (Grossberg 1976a, 1982a; Kohonen, 1984). Maximally compressed codes were used in ART 1 and ART 2 to enable a rigorous analysis to be made of how the bottom-up and top-down dynamics of ART systems can be joined together in a real-time self-organizing system capable of learning a stable pattern recognition code in response to an arbitrary sequence of input patterns. These results provide a computational foundation for designing ART systems capable of stably learning partially compressed recognition codes. The present invention contributes to such a design.

The main elements of a typical ART 1 module are illustrated in FIG. 1. $F_1$ and $F_2$ are fields of network nodes. An input is initially represented as a pattern of activity across the nodes of feature representation field $F_1$. The pattern of activity across category representation $F_2$ corresponds to the category representation. Because patterns of activity in both fields may persist after input offset (termination of the input) yet may also be quickly inhibited, these patterns are called short term memory, or STM, representations. The two fields, linked by bottom-up adaptive filter 22 and top-down adaptive filter 24, constitute the Attentional Subsystem. Because the connection weights defining the adaptive filters may be modified by inputs and may persist for very long times after input offset, these connection weights are called long term memory, or LTM, variables.

Each node of $F_1$ is coupled to each node of $F_2$ through a weighted connection in the adaptive filter 22. Those weights change with learning. Thus, selection of a category node in $F_2$ is determined by the nodes which are activated by an input pattern and the weights from those nodes to $F_2$. Each node of $F_2$ is in turn connected to each node of $F_1$ through weighted connections of the adaptive filter 24. Those weights are also learned. The learned weights define a template pattern from a selected category, and that pattern is received at the nodes of $F_1$ through the adaptive filter 24. Intersection of the input pattern from input 20 and the template through the adaptive filter 24 is activated as a matching pattern in $F_1$. The norm of the matching pattern is compared to the norm of the input pattern at 26. If the comparison exceeds a threshold vigilance parameter $\rho$, the system is allowed to resonate and the adaptive filters 22 and 24 adjust their weights in accordance with the matching pattern. On the other hand, if the comparison does not exceed the vigilance parameter threshold, $F_2$ is reset and a different category is selected. Prior to receiving the template pattern through the adaptive filter 24, a gain control gain 1 activates all nodes which receive the input pattern. This is an implementation of the ⅔ Rule. Similarly, gain 2 activates $F_2$. Offset of the input pattern triggers offset of gain 2 and causes rapid decay of short term memory at $F_2$. $F_2$ is thereby prepared to encode the next input pattern without bias.

FIG. 2 illustrates a typical ART search cycle. An input pattern I at 20 (FIG. 1) registers itself as a pattern X of activity across $F_1$ (FIG. 2a). The $F_1$ output signal vector S is then transmitted through the multiple converging and diverging weighted adaptive filter pathways 22 emanating from $F_1$, sending a net input signal vector T to $F_2$. The internal competitive dynamics of $F_2$ contrast-enhance T. The $F_2$ activity vector Y therefore registers a compressed representation of the filtered $F_1 \rightarrow F_2$ input and corresponds to a category representation for the input active at $F_1$. Vector Y generates a signal vector U that is sent top-down through the second adaptive filter 24, giving rise to a net top-down signal vector V to $F_1$ (FIG. 2b). $F_1$ now receives two input vectors, I and V. An ART system is designed to carry out a matching process whereby the original activity pattern X due to input pattern I may be modified by the template pattern V that is associated with the current activity category. If I and V are not sufficiently similar according to a matching criterion established by a dimensionless vigilance parameter $\rho$ at 26, a reset signal quickly and enduringly shuts off the active category representation (FIG. 2c), allowing a new category to become active. Search ensues (FIG. 2d) until either an adequate match is made or a new category is established.

In earlier treatments (e.g., Carpenter and Grossberg, 1987a), we proposed that the enduring shut-off of erroneous category representations by a nonspecific reset signal could occur at $F_2$ if $F_2$ were organized as a gated dipole field, whose dynamics depend on depletable transmitter gates. Though the new search process does not use a gated dipole field, it does retain and extend the core idea that transmitter dynamics can enable a robust search process when appropriately embedded in an ART system.

FIG. 3 shows the principal elements of a typical ART 2 module. It shares many characteristics of the ART 1 module, having both an input representation field $F_1$ and a category representation field $F_2$, as well as Attentional and Orienting Subsystems. FIG. 3 also illustrates one of the main differences between the examples of ART 1 and ART 2 modules so far explicitly developed; namely, the ART 2 examples all have three processing layers within the $F_1$ field. These three processing layers allow the ART 2 system to stably categorize sequences of analog input patterns that can, in general, by arbitrarily close to one another. Unlike in models such as back propagation, this category learning process is stable even in the fast learning situation, in which the LTM variables are allowed to go to equilibrium on each learning trial.

In FIG. 3, one $F_1$ layers w,x reads in the bottom-up input, one layer p,q reads in the top-down filtered input from $F_2$, and a middle layer v,u matches patterns from the top and bottom layers before sending a composite pattern back through the $F_1$ feedback loop. Each of the nodes i of $F_1$ in ART 1 is now replaced by a set of nodes $w_i$, $x_i$, $v_i$, $u_i$, $p_i$ and $q_i$. Like sets of those nodes span $F_1$ for processing of elements of the incoming pattern from an input stage I. Each of the large circles of FIG. 3 represents the computation of the $L_2$-norm of all the signals of a particular subfield, such as all of the signals $w_i$ across the $F_1$ field. Each of the smaller circles denotes a computation to generate each of the subfield signals. Both $F_1$ and $F_2$ are shunting competitive networks that contrast-enhance and normalize their activation patterns (Grossberg, 1982a).

SUMMARY OF THE INVENTION

A model of the chemical synapse is incorporated into a new Adaptive Resonance Theory neural network architecture called ART 3. ART 3 system dynamics model a simple, robust mechanism for parallel search of a learned pattern recognition code. This search mechanism was designed to implement the computational needs of ART systems embedded in network hierarchies, where there can, in general, be either fast or slow learning and distributed or compressed code representations. This search mechanism incorporates a code reset property that serves at least three distinct functions: to correct erroneous category choices, to learn from reinforcement feedback, and to respond to changing input patterns.

In accordance with the present invention, a pattern recognition system comprises a short term feature representation field of nodes which support signals derived from input signals defining an input pattern. At least one category node of a category representation field is selected based on a pattern from the short term feature representation field. A category selection may be reset with insufficient match between the selected category and the input pattern. In accordance with the present invention, a category is selected by generating activation signals at nodes of the category representation field which are a function of signals from nodes of the feature representation field weighted by selection weights. The selection weights are initially set by long term memory but are reduced in medium term memory in selecting a category after reset of a category selection. Thus, during a search process for a category which provides a sufficient match, those elements of an input pattern which initially result in the strongest activation signal in $F_2$ due to initial weights or input pattern strength have a corresponding high reduction in selection weight with each reset. With this medium term reduction in selection weights, the system automatically searches other categories in $F_2$ without requiring any specific inhibition in $F_2$.

In accordance with a further feature of the invention, contrast enhancement is obtained by further weighting signals from the feature representation field by the feedback of activation signals of nodes to which they are applied.

Preferably, the pattern recognition system is an ART system in which a long term memory template is generated based on the selected category, and that template is matched against the input pattern. Both the initial selection weights set by long term memory and the long term memory template are adapted to the input signals where a match is obtained.

In accordance with a further aspect of the invention, the category representation field of an ART system comprises a plurality of subfields of nodes supporting short term signals and feedback of short term signals within the short term field. Thus, the $F_2$ category representation field is homologous with the ART 2 $F_1$ feature representation field can thus serve as an $F_1$ field in a higher level ART system. Each of the short term signals of at least one subfield is based on signals specific to a category and also on nonspecific signals generated from across the short term field.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

In applications, ART modules are often embedded in larger architectures that are hierarchically organized. An example of one such hierarchy, a self-organizing model of the perception and production of speech is presented in Cohen, Grossberg, and Stork, 1988. Several copies of an ART module are cascaded upward, with partially compressed codes at each level. Top-down ART filters both within the perception system and from the production system to the perception system serve to stabilize the evolving codes as they are learned. We will now consider how an ART 2 module can be adapted for use in such a hierarchy.

Figure 1:
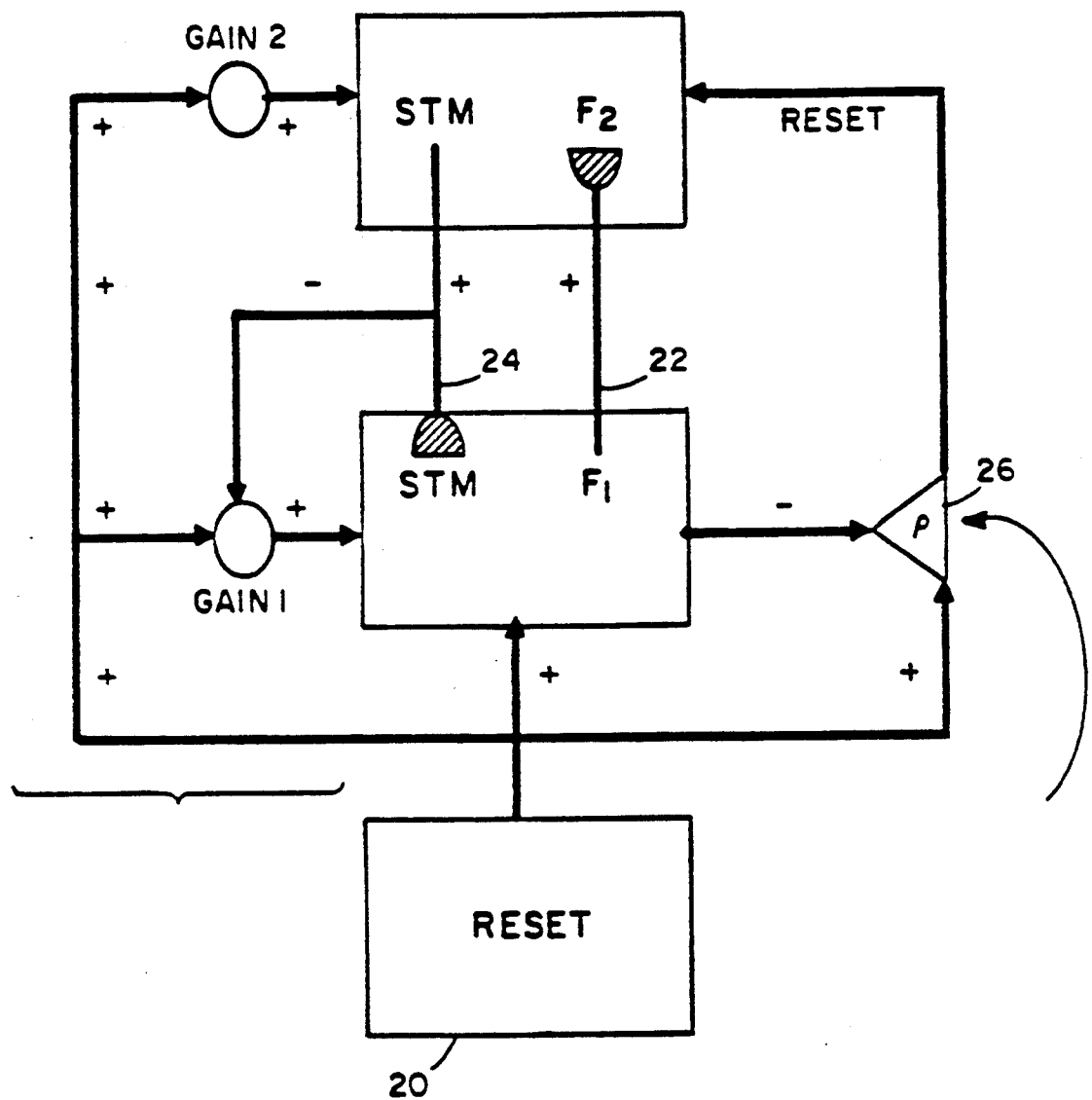
FIG. 1 illustrates a prior adaptive resonance theory (ART) system.
Figure 2A:
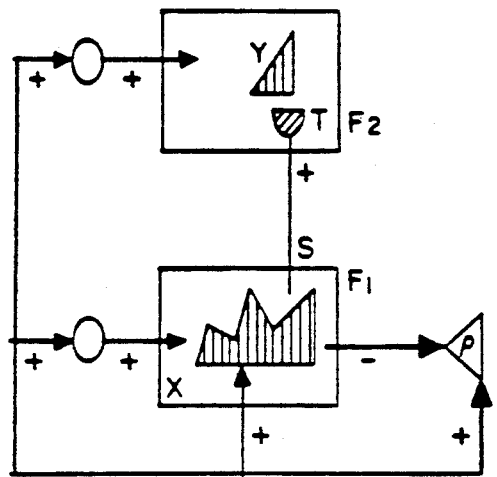
FIGS. 2a through 2d illustrate a search cycle in the system of FIG. 1.
Figure 2B:
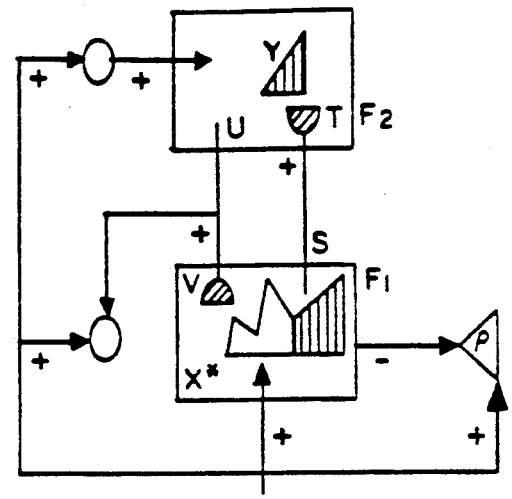
Figure 2C:
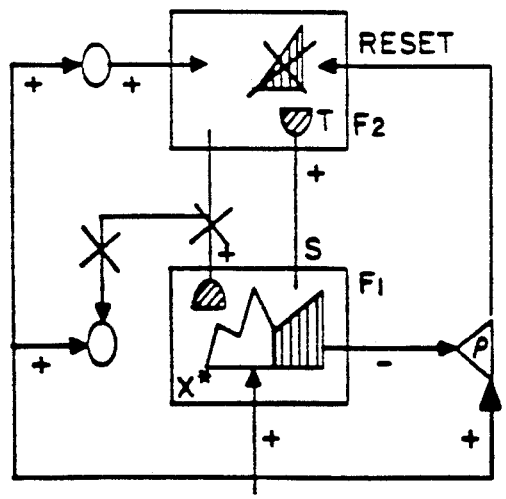
Figure 2D:
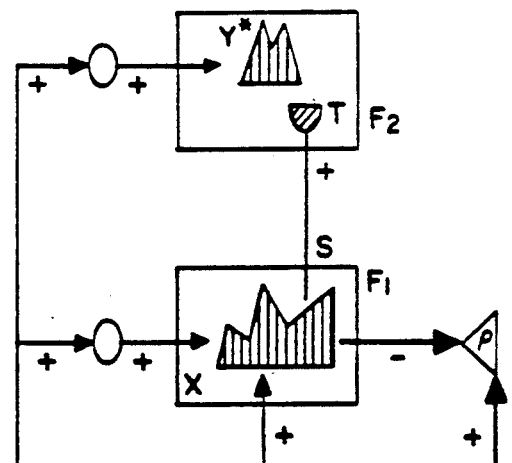
Figure 3:
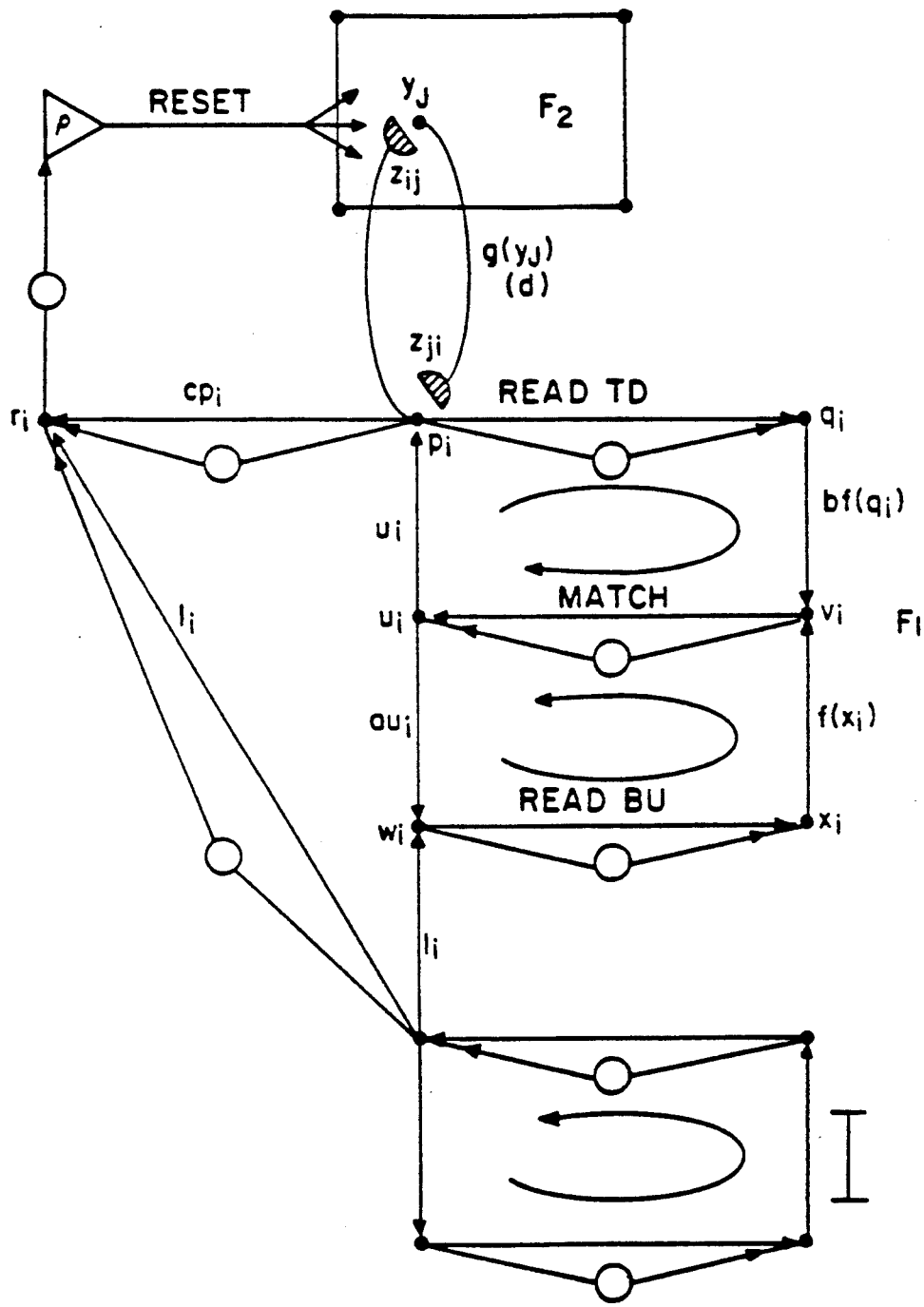
FIG. 3 illustrates a prior ART 2 system.
Figure 4:
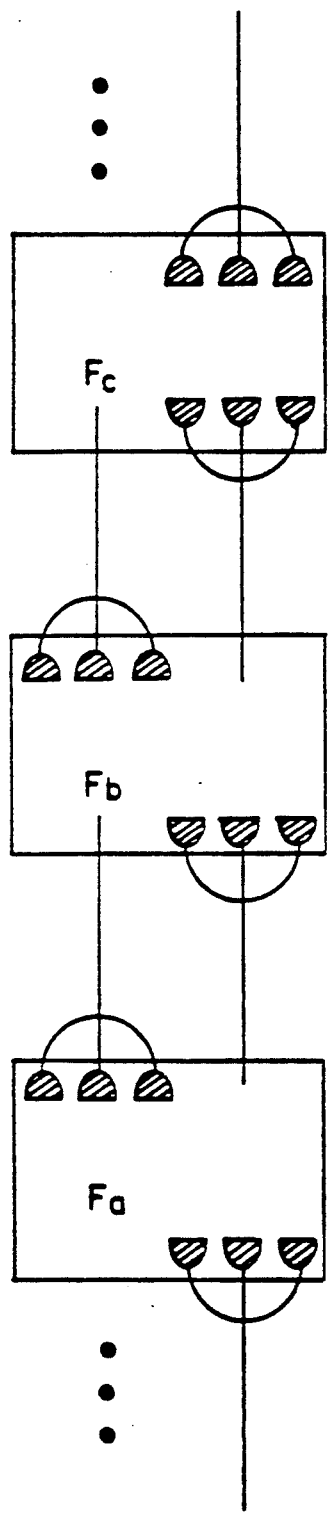
FIG. 4 illustrates stages ART systems in which a center field serves as fields in both the lower and upper systems.

When an ART module is embedded in a network hierarchy, it is no longer possible to make up a sharp distinction between the characteristics of the input representation field $F_1$ and the category representation field $F_2$. For example, within the auditory perception system of Cohen et al., the partially compressed auditory code acts both as the category representation field for the invariant feature field, and as the input field for the compressed item code field. As illustrated in FIG. 4, a Field $F_a$ selects a category pattern that is a partially compressed code in category representation field $F_b$. $F_b$ must then in turn serve as a feature representation field in selecting a category pattern in $F_c$. In order for fields to serve both functions, the basic structures of all the network fields in a hierarchical ART system should be homologous, in so far as possible. This constraint is satisfied if all fields of the hierarchy are endowed with the $F_1$ structure of an ART 2 module (FIG. 3). Such a design is sufficient for the $F_2$ field as well as the $F_1$ field because the principal property required of a category representation field, namely that input patterns be contrast-enhanced and normalized, is a property of the three-layer $F_1$ structure. The system shown in FIG. 4 is called an ART bidirectional hierarchy, with each field homologous to all other fields and linked to contiguous fields by both bottom-up and top-down adaptive filters.

Figure 5:
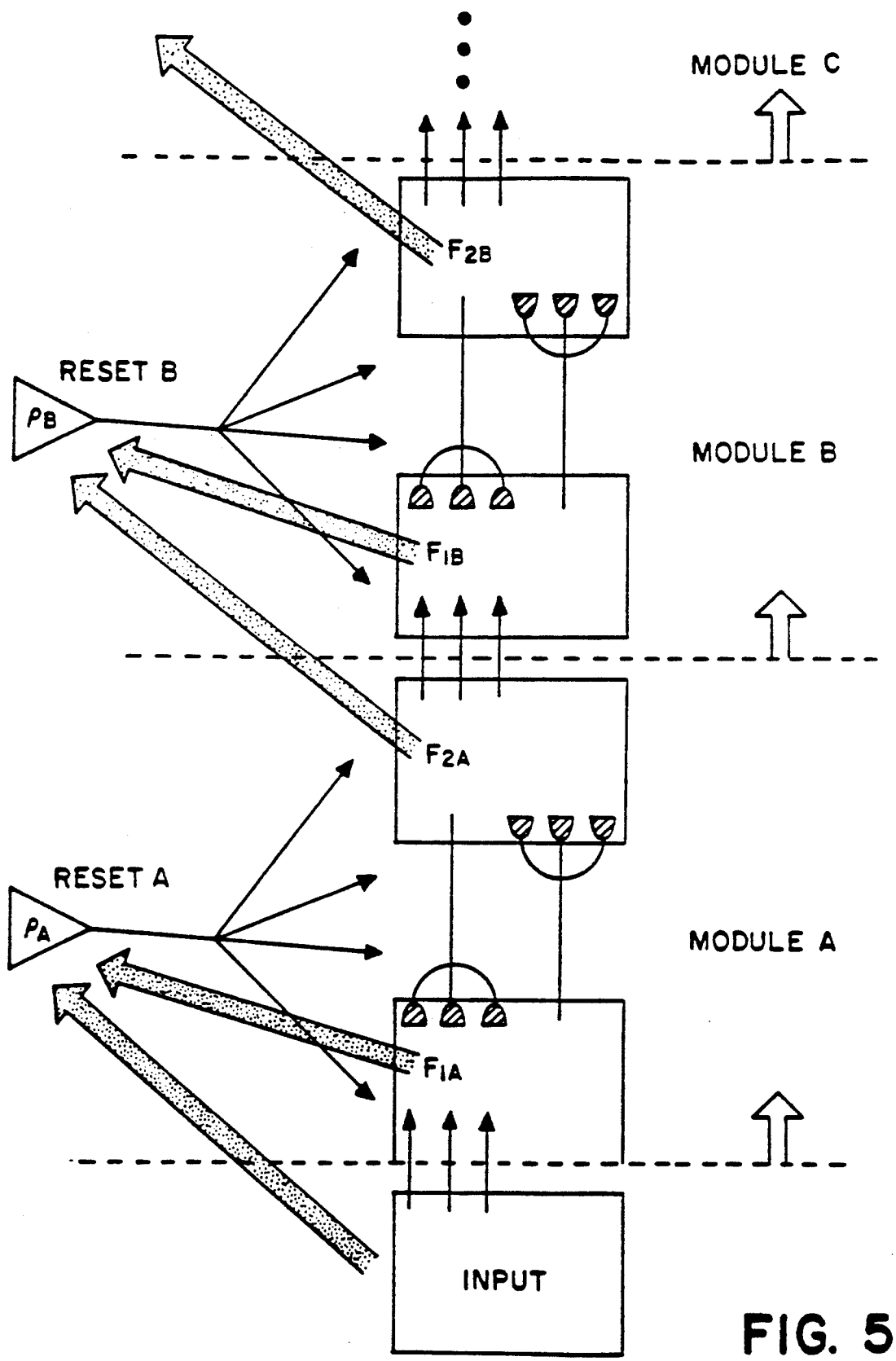
FIG. 5 illustrates an ART cascade of two ART modules.

For the ART hierarchy shown in FIG. 4, activity changes at any level can ramify throughout all lower and higher levels. It is sometimes desirable to buffer activity patterns at lower levels against changes at higher levels. This can be accomplished by inserting only a bottom-up pathway between two-field ART modules without a top down pathway as between $F_{2A}$ and $F_{1B}$ in FIG. 5. FIG. 5 illustrates a sequence of modules A,B,C . . . forming an ART cascade on. The fields are designated $F_1$ and $F_2$ as before; they are further designated by the module A or B. Module A generates a RESET A from $F_{1A}$ and from the input in accordance with a vigilance parameter $\rho_a$. The specific mechanism within $F_{1A}$ and $F_{2A}$ is the subject of the present invention as described below. Similarly, module B is reset in response to signals from $F_{2A}$ and $F_{1B}$ in accordance with a vigilance parameter $\rho_b$. The "category representation" field $F_{2A}$ acts as the input field for the next field $F_{1B}$. As in an ART 2 module (FIG. 3), connections from the input field $F_{2A}$ to the first field $F_{1B}$ of the next module are nonadaptive and unidirectional. Connections between $F_{1B}$ and $F_{2B}$ are adaptive and bidirectional. This scheme repeats itself throughout the hierarchy. Activity changes due to a reset event at a lower level can be felt at higher levels via an ascending cascade of reset events. In particularly, reset at the lower input level can lead to a cascade of input reset events up the entire hierarchy.

We now consider the problem of implementing parallel search among the distributed codes of a hierarchical ART system. Assume that a top-down/bottom-up mismatch has occurred somewhere in the system. How can a reset signal search the hierarchy in such a way that an appropriate new category is selected? The search scheme for ART 1 and ART 2 modules incorporates an asymmetry in the design of levels $F_1$ and $F_2$ that is inappropriate for ART hierarchies whose fields are homologous. The ART 3 search mechanism described below eliminates that asymmetry.

A key observation is that a reset signal can act upon an ART hierarchy between its field $F_a, F_b, F_c \ldots$ Locating the site of action of the reset signal between the fields allows each individual field to carry out its pattern processing function without introducing processing biases directly into a field's internal feedback loops.

The new ART search mechanism has a number of useful properties. It: (a) works well for mismatch, reinforcement, or input reset; (b) is simple; (c) is homologous to physiological processes; (d) fits naturally into network hierarchies with distributed codes and slow or fast learning; (e) is robust in that it does not require precise parameter choices, timing, or analysis of classes of inputs; (f) requires no new anatomy, such as new wiring or nodes, beyond what is already present in the ART 2 architecture; (g) brings new computational power to the ART systems; and (h) although derived from the ART system, can be used to search other neural network architectures as well.

The computational requirements of the ART search process can be fulfilled by formal properties of neurotransmitters, if these properties are appropriately embedded in the total architecture model. The present search model specifies rate equations for transmitter production, release and inactivation as discussed below. The main properties used are illustrated in a chemical model in Ito (1984). In particular, the ART 3 search equations incorporates the dynamics of production and release of a chemical transmitter substance; the inactivation of transmitter at postsynaptic binding sites; and the modulation of these processes via a nonspecific control signal. The net effect of these transmitter processes is to alter the ionic permeability at the postsynaptic membrane site, thus effecting excitation or inhibition of the postsynaptic cell.

The r :urotransmitter model is implemented in an ART 3 system by modifying the bottom-up adaptive filter 22 and the manner in which it effects activation of nodes in $F_2$. To illustrate the correspondence to the neurotransmitter model, terms such as transmitter and synapse are used herein. However, the present invention is directed to the implementation of a model so the transmitters are actually electronically stored values as are the activation signals. The signals are processed in accordance with the equations and procedures discussed below.

Figure 6:
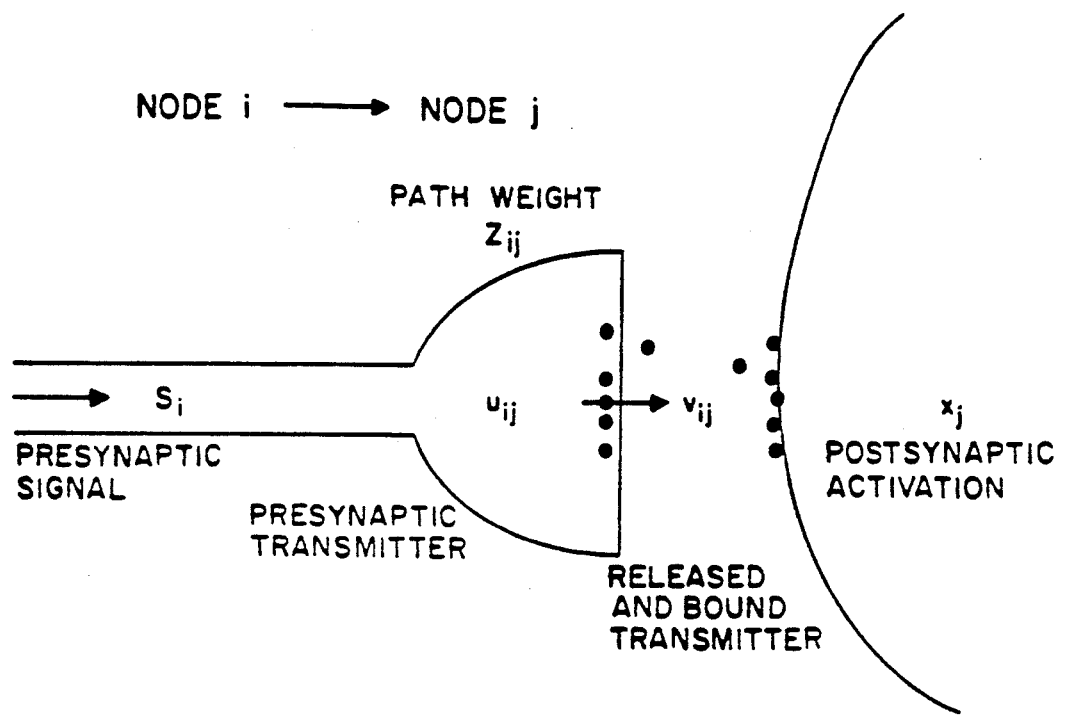
FIG. 6 illustrates the structure of the adaptive filter in accordance with the present invention.

The notation to describe these transmitter properties is summarized in FIG. 6, for a synapse between the ith presynaptic node and the jth postsynaptic node. The presynaptic signal, or action potential, $S_i$ is received from a node in $F_1$ and arrives at a synapse whose adaptive weight, or long term memory trace, is denoted $Z_{ij}$. The variable $z_{ij}$ is identified with the maximum amount of available transmitter. When the transmitter at this synapse is fully accumulated, the amount of transmitter $u_{ij}$ available for release is equal to $z_{ij}$. When a signal $S_i$ arrives, transmitter is typically released. The variable $v_{ij}$ denotes the amount of transmitter released into the extracellular space, a fraction of which is assumed to be bound at the postsynaptic cell surface and the remainder rendered ineffective in the extracellular space. Finally, $x_j$ denotes the activity, or membrane potential, of the postsynaptic cell, the $F_2$ node.

EQUATIONS FOR TRANSMITTER PRODUCTION, RELEASE, AND INACTIVATION

The search mechanism works well if it possesses a few basic properties. These properties can be realized using one of several closely related sets of equations, with corresponding differences in biophysical interpretation. An illustrative system of equations is described below.

Equations (1)-(3) govern the dynamics of the variables $z_{ij}, u_{ij}, v_{ij}$, and $x_j$ at the $ij^{th}$ pathway and $j^{th}$ node of an ART 3 system.

Changes in presynaptic transmitter $u_{ij}$ are governed by $$\frac{du_{ij}}{dt} = (z_{ij} - u_{ij}) - u_{ij}R_r \quad (1)$$

where $R_r$ is a release rate factor which will be shown in equation (9) to be a function of the presynaptic signal $S_i$ and the postsynaptic activation $x_j$.

Changes in bound transmitter $v_{ij}$ are governed by $$\frac{dv_{ij}}{dt} = -v_{ij} + u_{ij}R_r - v_{ij}R_i \quad (2)$$
$$= -v_{ij} + u_{ij}R_r - v_{ij}S_{RES}$$

where $R_i$ is an inactivation rate factor and $S_{RES}$ is a reset signal.

Changes in postsynaptic activation $x_j$ are governed by $$\epsilon \frac{dx_j}{dt} = -x_j + (A - x_j)[\text{excitatroy inputs}] - \quad (3)$$
$$(B + x_j)[\text{inhibitory inputs}]$$
$$= -x_j + (A - x_j)\left[\sum_i v_{ij} + \{\text{intrafield feedback}\}\right] -$$
$$(B + x_j)S_{RES}$$

The first term to the right of equation (1) says that presynaptic transmitter is produced and/or mobilized until the amount $u_{ij}$ of transmitter available for release reaches the maximum level $z_{ij}$. The adaptive weight $z_{ij}$ itself changes on the slower time scale of learning, but remains essentially constant on the time scale of a single reset event. By the final terms of equation (1) available presynaptic transmitter $u_{ij}$, a selection weight, is released at a rate that is specified below.

But for a fraction which is inactivated, the released presynaptic transmitter $u_{ij}$ because postsynaptic bound transmitter under equation (2). For simplicity, we ignore the fraction of released transmitter that is inactivated in the extracellular space before bonding. Equation (2) says only that the bound transmitter is inactivated by the reset signal. In the absence of inputs, the term $-v_{ij}$ indicates that the activity of $v_{ij}$ passively decays to zero as the released and bound transmitters are dissipated.

Equation (3) for the postsynaptic activity $x_j$ is a shunting mechanism equation such that excitatory inputs drive $x_j$ up toward a maximum depolarized level equal to $A$; inhibitory inputs drive $x_j$ down toward a minimum hyperpolarized level equal to $-B$; and activity passively decays to a resting level equal to 0 in the absence of inputs. The net effect of bound transmitter at all synapses converging on the jth node is assumed to be excitatory, via the term $$\Sigma v_{ij}$$

Internal feedback from within the target field (FIG. 3) is excitatory, while the nonspecific reset signal is inhibitory. Parameter $\epsilon$ in equations (3) is small, corresponding to the assumption that activation dynamics are fast relative to the transmitter accumulation rate, equal to 1 in the first term to the right of equation (1).

The ART 3 system can be simplified for purpose of simulation. Suppose that $\epsilon \ll 1$ in (3); the reset signals in (2) and (3) are either 0 or $\gg 1$; and net intrafield feedback is excitatory. Then equations (1), (5), and (6) below approximate the main properties of ART 3 system dynamics.

The simplified ART 3 Equations are then:

$$\frac{du_{ij}}{dt} = (z_{ij} - u_{ij}) - u_{ij}R_r \quad (1)$$

$$\begin{cases} \frac{dv_{ij}}{dt} = -v_{ij} + u_{ij}R_r & \text{if reset} = 0 \\ v_{ij}(t) = 0 & \text{if reset} \gg 1 \end{cases} \quad (5)$$

$$x_j(t) = \begin{cases} \Sigma_i v_{ij} + [\text{intrafield feedback}] & \text{if reset} = 0 \\ 0 & \text{if reset} \gg 1. \end{cases} \quad (6)$$

In equations (2) and (3), the reset signal acts in two ways, by inactivating bound transmitter and directly inhibiting the postsynaptic membrane. Alternatively, the reset signal may accomplish both these goals in a single process if all excitatory inputs in (3) are realized using chemical transmitters. Letting $w_j$ denote the net excitatory transmitter reaching the $j^{th}$ target cell via intrafield feedback, an illustrative system of this type is given by equations (1), (2), (7) and (8) below.

Presynaptic Transmitter:

$$\frac{du_{ij}}{dt} = (z_{ij} - u_{ij}) - u_{ij}R_r \quad (1)$$

Bound Transmitter:

$$\frac{dv_{ij}}{dt} = -v_{ij} + u_{ij}R_r - v_{ij}S_{RES} \quad (2)$$

-continued $$\frac{dw_j}{dt} = -w_j + [\text{intrafield feedback}] - w_j S_{RES} \quad (7)$$

Postsynaptic Activation:

$$\epsilon \frac{dx_j}{dt} = -x_j + (A - x_j)\left(\sum_i v_{ij} + w_j\right) \quad (8)$$

The reset signal now acts as a chemical modulator that inactivates the membrane channels at which transmitter is bound. It thus appears in equations (2) and (7), but not in equation (8) for postsynaptic activation.

When the reset signal can be only 0 or $\gg 1$, the simplified system of equations (1), (5), and (6) approximates both versions of the ART 3 system. However, if the reset signal can vary continuously in size, equations (2), (7), and (8) can preserve relative transmitter quantities from all input sources. Thus this system is a better model for the intermediate cases than equations (2) and (3).

An additional inhibitory term in the postsynaptic activation equation (8) helps to suppress transmitter release, as illustrated in the simulation below.

TRANSMITTER RELEASE RATE

Figure 7:
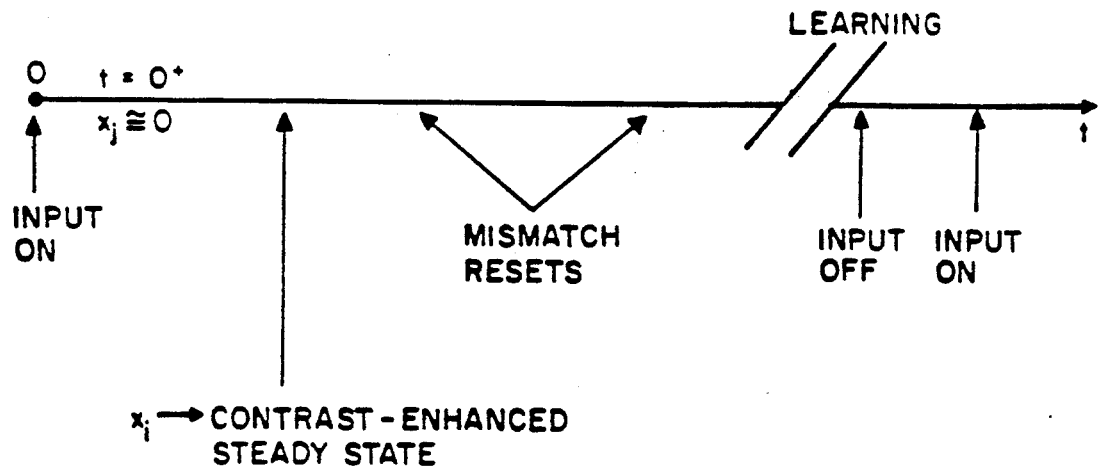
FIG. 7 is a timing chart illustrating operation of the present invention.

To further specify the ART search model, we now characterize the transmitter release and inactivation rates in equations (1) and (2). Then we trace the dynamics of the system at key time intervals during the presentation of a fixed input pattern (FIG. 7). We first observe system dynamics during a brief time interval after the input turns on ($t=0^+$), when the signal $S_i$ first arrives at the synapse. We next consider the effect of subsequent internal feedback signals from within the target field, following contrast-enhancement of the inputs. We observe how the ART 3 model responds to a reset signal by implementing a rapid and enduring inhibition of erroneously selected pattern features. Then we analyse how the ART 3 model responds if the input pattern changes.

We will begin with the ART Search Hypothesis 1: Presynaptic transmitter $u_{ij}$ is released at a rate jointly proportional to the presynaptic signal $S_i$ and a function $f(x_j)$ of the postsynaptic activity. That is, in equations (1), (2), and (5), the release rate factor $$R_r = S_i f(x_j).$$

Figure 8:
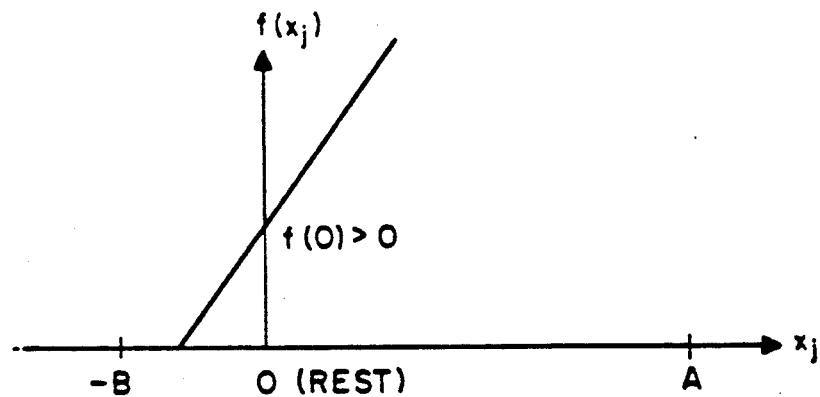
FIG. 8 is an illustration of a function used in setting the transmitter release rate.

The function $f(x_j)$ in equation (9) has the qualitative properties illustrated in FIG. 8. In particular, $f(x_j)$ is assumed to have a positive value when $x_j$ is at its 0 resting level, so that transmitter $u_{ij}$ can be released when the signal $S_i$ arrives at the synapse. If $f(0)$ were equal to 0, no excitatory signal could reach a postsynaptic node at rest, even if a large presynaptic signal $S_i$ were sent to that node. The function $f(x_j)$ is also assumed to equal 0 when $x_j$ is significantly hyperpolarized, but to rise steeply when $x_j$ is near 0. In the simulations, $f(x_j)$ is linear above a small negative threshold.

The form factor $S_i f(x_j)$ is a familiar one in the neuroscience and neural network literatures. In particular, such a product is often used to model associative learning, where it links the rate of learning in the ijth pathway to the presynaptic signal $S_i$ and the postsynaptic activity $x_j$. Associative learning occurs, however, on a time scale that is much slower than the time scale of transmitter release. On the fast time scale of transmitter release, the form factor $S_i f(x_j)$ may be compared to interactions between voltages and ions in the chemical model. For example, note the dependence of the presynaptic signal on the $Na^+$ ion; the postsynaptic signal on the $Ca^{2+}$ ion; and transmitter release on the joint fluxes of these two ions. The ART Search Hypothesis 1 thus formalizes a known type of synergetic relationship between presynaptic and postsynaptic processes in effecting transmitter release. Moreover, the rate of transmitter release is typically a function of the concentration of $Ca^{2+}$ in the extracellular space, and this function has qualitative properties similar to the function $f(x_j)$ shown in FIG. 8 (Kandel and Schwartz, 1981, p. 84; Kuffler, Nichols, and Martin, 1984, p. 244).

SYSTEM DYNAMICS AT INPUT ONSET: AN APPROXIMATELY LINEAR FILTER

Some implications of the ART Search Hypothesis 1 will now be summarized. Assume that at time $t=0$ transmitter $u_{ij}$ has accumulated at its maximal level $z_{ij}$ and that activity $x_j$ and bound transmitter $v_{ij}$ equal 0. Consider a time interval $t=0^+$ immediately after a signal $S_i$ arrives at the synapse. During this brief initial interval, the ART equations approximate the linear filter dynamics typical of many neural network models. In particular, equations (2) and (9) imply that the amount of bound transmitter is determined by equation $$\frac{dv_{ij}}{dt} = -v_{ij} + u_{ij} S_i f(x_j) - v_{ij} R_i \quad (10)$$

Thus at times $t=0^+$, $$\frac{dv_{ij}}{dt} \approx z_{ij} S_i f(0) \quad (11)$$

and so $$v_{ij}(t) \approx K(t) S_i z_{ij} \text{ for times } t=0^+. \quad (12)$$

Because equation (12) holds at all the synapses adjacent to cell j, equation (6) implies that $$x_j(t) \approx \sum_i K(t) S_i z_{ij} = K(t) S \cdot z_j \text{ for times } t=0^+. \quad (13)$$

Figure 9A:
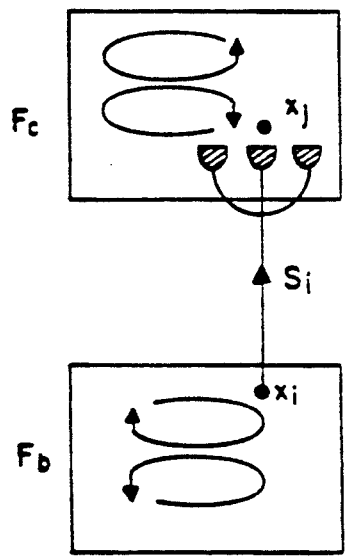
FIG. 9a illustrates two fields of a system embodying the present invention.
Figure 9B:
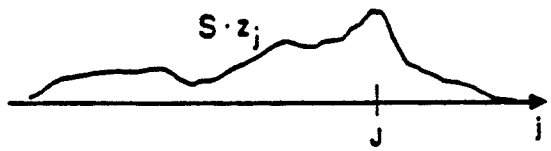
FIG. 9b illustrates the initial activation signal $x_j$.

Here S denotes the vector $(s_1 \ldots s_n)$, $z_j$ denotes the vector $(z_{1j} \ldots z_{nj})$, and $i=1 \ldots n$. Thus in the initial moments after a signal arrives at the synapse, the small amplitude activity $x_j$ at the postsynaptic cell grows in proportion to the dot product of the incoming signal vector S times the adaptive weight vector $z_j$. FIG. 9a illustrates two fields, designated $F_b$ and $F_c$ to be consistent with FIG. 16, joined by a bottom-up filter 22 of weights $z_{ij}$. The initial short term memory activity $x_j$ in $F_c$ is illustrated in FIG. 9b.

SYSTEM DYNAMICS AFTER INTRAFIELD FEEDBACK

Amplification of Transmitter Release by Postsynaptic Potential

Figure 9C:
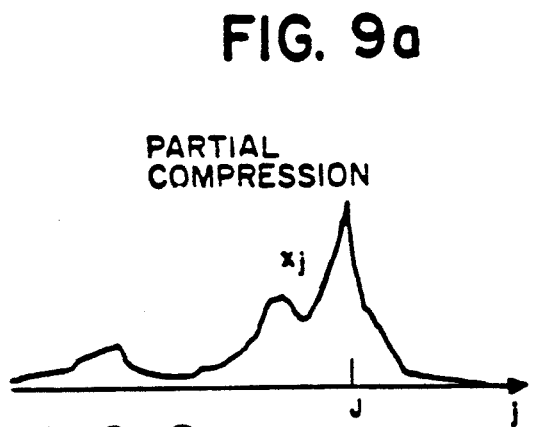
FIGS. 9c and 9d illustrate the activation signal after contrast enhancement with partial compression and choice, respectively.
Figure 9D:
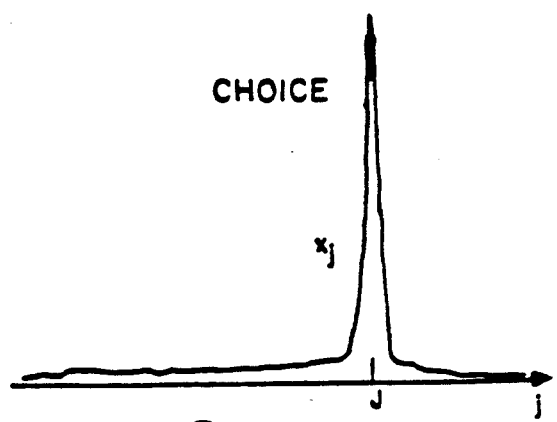

In the next time interval, the intrafield feedback signal contrast-enhances the Initial signal pattern (13) via equation (6) and amplifies the total activity across field $F_c$ in FIG. 12. FIGS. 9c and 9d show typical contrast-enhanced activity profiles: partial compression of the initial signal pattern in FIG. 9c; or maximal compression, or choice, in FIG. 9d where only one postsynaptic node remains active due to the strong competition within the field $F_c$.

In all, the model behaves initially like a linear filter. The resulting pattern of activity across postsynaptic cells is contrast-enhanced, as required in the ART 2 model as well as in the many other neural network models that incorporate competitive learning (Grossberg, 1988). For many neural network systems, this combination of computational properties is all that is needed. These models implicitly assume that intracellular transmitter $u_{ij}$ does not alter the rate of transmitter release:

$$u_{ij} = z_{ij} \text{ and } v_{ij} = z_{ij} S_i. \quad (14)$$

If the linear filtering properties implied by (14) work well for many purposes, why complicate the system by adding additional hypotheses? Even a new hypothesis that makes a neural network more realistic physiologically needs to be justified functionally, or it will obscure essential system dynamics. Why, then, add two additional nonlinearities to the portion of a neural network system responsible for transmitting signals from one location to another? The following discussion suggests how nonlinearities of synaptic transmission and neuromodulation can, when embedded in an ART circuit, help to correct coding errors by triggering a parallel search, allow the system to respond adaptively to reinforcement, and rapidly reset itself to changing input patterns.

Figure 10:
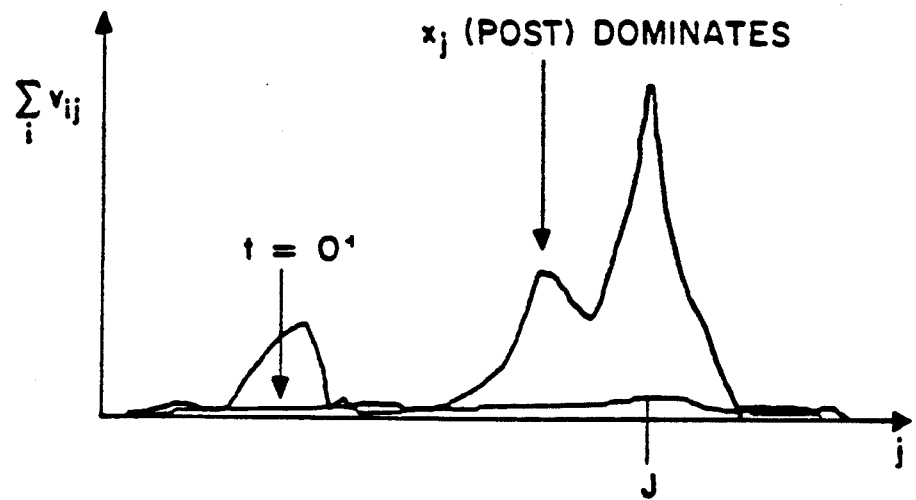
FIG. 10 illustrates changes in the activation signal with time.

In equation (10), term $$u_{ij} S_i f(x_j) \quad (15)$$

for the amount of transmitter released per unit time implies that the original incoming weighted signal $z_{ij} S_i$ is distorted both by depletion of the presynaptic transmitter $u_{ij}$ and by the activity level $x_j$ of the postsynaptic cell. If these two nonlinearities are significant, the net signal in the ijth pathway depends jointly on the maximal weighted signal $z_{ij} S_i$, the prior activity in the pathway, as reflected in the amount of depletion of the transmitter $u_{ij}$, and the immediate context in which the signal is sent, as reflected in the target cell activity $x_j$. In particular, once activity in a postsynaptic cell becomes large, this activity dominates the transmitter release rate, via the term $f(x_j)$ in (15). In other words, although linear filtering properties initially determine the small-amplitude activity pattern of the target field $F_2$, once intrafield feedback amplifies and contrast-enhances the postsynaptic activity $x_j$ (FIGS. 9c and d), it plays a major role in determining the amount of released transmitter $v_{ij}$ (FIG. 10). In particular, the postsynaptic activity pattern across the field $F_c$ that represents the recognition code (FIG. 9d) is imparted to the pattern of released transmitter (FIG. 10), which then also represents the recognition code, rather than the initial filtered pattern $S \cdot z_j$.

SYSTEM DYNAMICS DURING RESET: INACTIVATION OF BOUND TRANSMITTER CHANNELS

The dynamics of transmitter release implied by the ART Search Hypothesis 1 can be used to implement the reset process, by postulating the ART Search Hypothesis 2: The nonspecific reset signal quickly inactivates postsynaptic membrane channels at which transmitter is bound.

The reset signal in equations (5) and (6) may be interpreted as assignment of a large value to the inactivation rate in a manner analogous to the action of a neuromodulator. Inhibition of postsynaptic nodes breaks the strong intrafield feedback loops that implement ART 2 and ART 3 matching and contrast-enhancement (equation (3) or (6)).

Let us now examine system dynamics following transmitter inactivation. The pattern of release transmitter can be viewed as a representation of the postsynaptic recognition code. The arrival of a reset signal implies that some part of the system has judged this code to be erroneous, according to some criterion. The ART Search Hypothesis 1 implies that the largest concentrations of bound extracellular transmitter are adjacent to the nodes which most actively represent this erroneous code. The ART Search Hypothesis 2 therefore implies that the reset process selectively removes transmitter from pathways leading to the erroneous representation.

Figure 11:
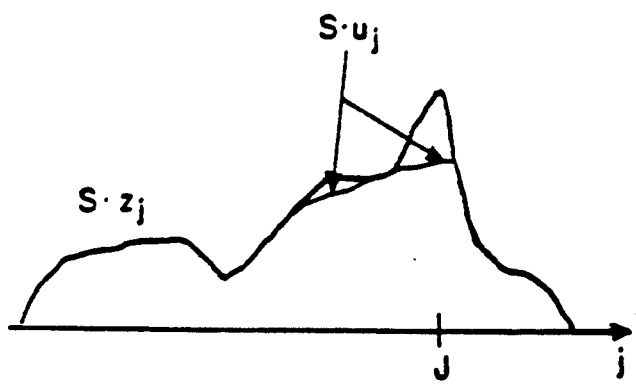
FIG. 11 illustrates the bias against pathways after reset.

After the reset wave has acted, the system is biased against activation of the same nodes, or features, in the next time interval: Whereas the transmitter signal pattern $S \cdot u_j$ originally sent to target nodes at times $t = 0^+$ was proportional to $S \cdot z_j$, as in equation (12), the transmitter signal pattern $S \cdot u_j$ after the reset event is no longer proportional to $S \cdot z_j$. Instead, it is selectively biased against those features that were previously active (FIG. 11). After a mismatch reset, the adaptive filter delivers a smaller signal $S \cdot u_j$ to the previously selected category representation, the one that generated the reset signal. This is because under equation 1 the presynaptic transmitters $u_{ij}$ are drawn rapidly from the presynapse with $R_r$ being a function of $f(x_j)$ (equation 9), and the level of $u_{ij}$ only rebuilds slowly with $(z_{ij} - u_{ij})$. The new signal pattern $S \cdot u_j$ will lead to selection of another contrast-enhanced representation, which may or may not then be reset. This search process continues until an acceptable match is found, possibly through the selection of a previously inactive representation.

Thus $u_{ij}$ can be seen as a category selection weights which is initially set to equal the long term memory weight $z_{ij}$ but which is reduced in category selection after reset. The amount of reduction of the selection weight is a function of the categories selected prior to reset. Because the change in selection weights continues after reset the selection weights are stored for a longer term than are short term memory activations; yet they are changed over a much shorter term relative to the long term memory weights $z_{ij}$. The selection weights $u_{ij}$ are thus medium term memory values.

Figure 12A:
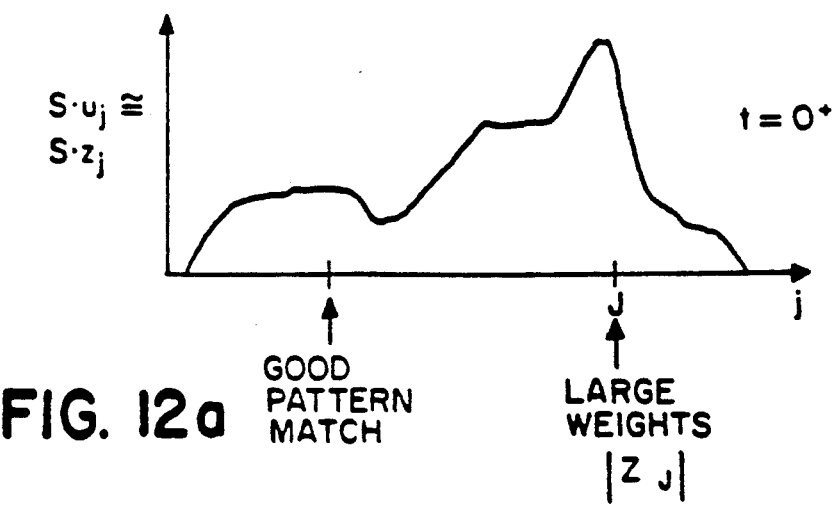
FIGS. 12a, b and c further illustrate the bias against pathways after reset.
Figure 12B:
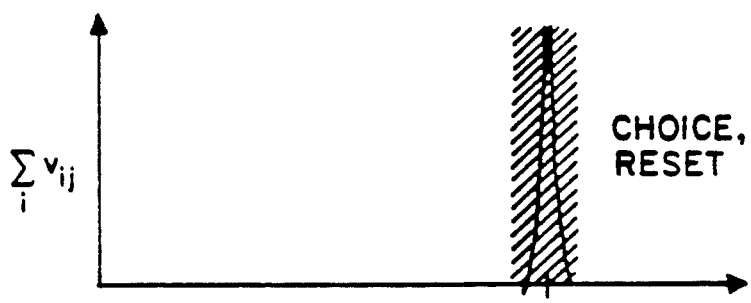
Figure 12C:
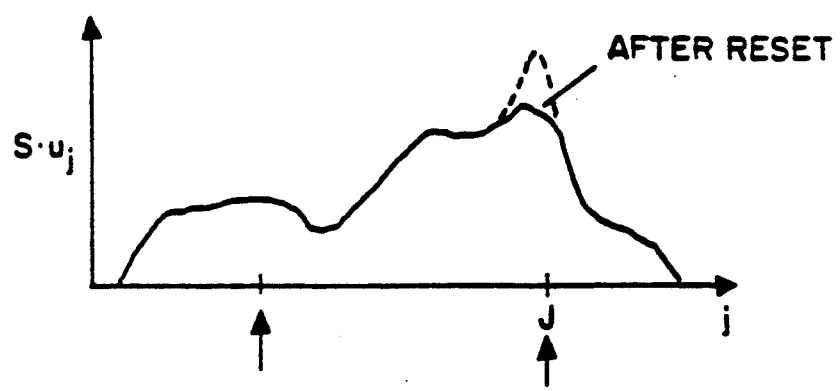

This search process is relatively easy to implement, requiring no new nodes or pathways beyond those already present in ART 2 modules. It is also robust, since it does not require tricky timing or calibration. How the process copes with a typical slow learning situation is illustrated in FIGS. 12a, 12b and 12c. With slow learning, an input can select and begin to train a new category, so that the adaptive weights correspond to a perfect pattern match during learning. However, the input may not be on long enough for the adaptive weights to become very large. That inputs may later activate a different category node whose weights are large but whose vector of adaptive weights forms a poorer match than the original, smaller weights.

FIG. 12a shows such a typical filtered signal pattern S·$z_j$. During the initial processing interval ($t=0^+$) the transmitted signal S·$u_j$ and the postsynaptic activity $x_j$ are proportional to S·$z_j$. Suppose that weights $z_{ij}$ in pathways leading to the Jth node are large, but that the vector pattern $z_j$ is not an adequate match for the signal pattern S according to the vigilance criterion. Also suppose that dynamics in the target field $F_c$ lead to a "choice" following competitive contrast-enhancement (FIG. 12b), and that the chosen node J represents a miscategory. Large amounts of transmitter will thus be released from synapses adjacent to node J, but not from synapses adjacent to other nodes. The reset signal will then selectively inactivate transmitter at postsynaptic sites adjacent to the Jth node. Following such a reset wave, the new signal pattern S·$u_j$ will be biased against the Jth node relative to the original signal pattern. However, it could happen that the time interval prior to the reset signal is so brief that only a small fraction of available transmitter is released. Then S·$u_j$ could still be large relative to a "correct" S·$u_j$ after reset occurs (FIG. 12c). If this were to occur, the Jth node would simply be chosen again, then reset again, leading to an accumulating bias against that choice in the next time interval. This process could continue until enough transmitter $v_{ij}$ is inactivated to allow another node, with smaller weights $z_{ij}$ but a better pattern match, to win the competition. Simulations of such a reset sequence are illustrated below.

Figure 13:
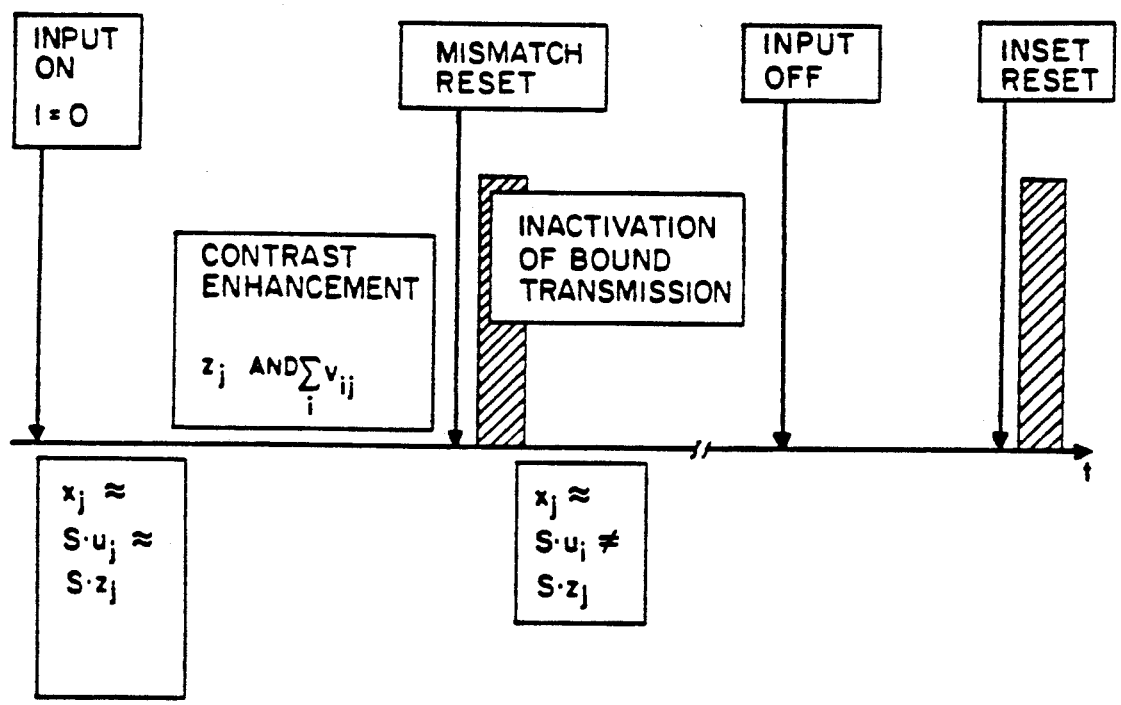
FIG. 13 is a timing chart illustrating operation of the present invention.

FIG. 13 summarizes system dynamics of the ART search model during a single input presentation. Initially the transmitted signal pattern S·$u_j$, as well as the postsynaptic activity $x_j$, are proportional to the weighted signal pattern S·$z_j$ of the linear filter. The postsynaptic activity pattern is then contrast-enhanced, due to the internal competitive dynamics of the target field. The ART Search Hypothesis 1 implies that the transmitter release rate is greatly amplified in proportion to the level of postsynaptic activity. A subsequent reset signal selectively inactivates transmitter in those pathways that caused an error. Following the reset wave, the new Signal S·$u_j$ is no longer proportional to S·$z_j$ but is, rather, biased against the previously active representation. A series of reset events ensue, until an adequate match or a new category is found. Learning occurs on a time scale that is long relative to that of the search process.

AUTOMATIC STM RESET BY REAL-TIME INPUT SEQUENCES

The ART 3 architecture serves other functions as well as implementing the mismatch-reset-search cycle. In particular it allows an ART system to dispense with additional processes to reset STM with an onset or offset of an input pattern. The representation of input patterns as a sequence, $I_1, I_2, I_3, \ldots$, corresponds to the assumption that each input is constant for a fixed time interval. In practice, an input vector I(t) may vary continuously through time. The input need never be constant over an interval, and there may be no temporal marker to signal offset or onset of "an input pattern" per se. Furthermore, feedback loops within a field or between two fields can maintain large amplitude activity even when I(t)=0. Adaptive resonance develops only when activity patterns across fields are amplified by such feedback loops and remain stable for a sufficiently long time to enable adaptive weight changes to occur (Grossberg, 1976b, 1982a). In particular, no reset waves are triggered during a resonant event.

The ART reset system functionally defines the onset of a "new" input as a time when the orienting subsystem emits a reset wave. This occurs, for example, in the ART 2 module (FIG. 3) when the angle between the vectors I(t) and p(t) becomes so large that the norm of r(t) falls below the vigilance level ρ(t), thereby triggering a search for a new category representation. This is called an input reset event, to distinguish it from a mismatch reset event, which occurs while the bottom-up input remains nearly constant over a time interval but mismatches the top-down expectation that it has elicited from level $F_2$ (FIG. 2).

This property obviates the need to mechanically define the processing of input onset or offset. The ART Search Hypothesis 3, which postulates restoration of a resting state between successive inputs (Carpenter and Grossberg, 1989), is thus not needed. Presynaptic transmitter may not be fully accumulated following an input reset event, just as it is not fully accumulated following a mismatch reset event. For both types of reset, the orienting subsystem judges the active code to be incorrect, at the present level of vigilance, and the system continues to search until it finds an acceptable representation.

REINFORCEMENT FEEDBACK

The mechanisms described thusfar for STM reset are part of the recognition learning circuit of ART 3. Recognition learning is, however, only one of several processes whereby an intelligent system can learn a correct solution to a problem. We have called Recognition, Reinforcement, and Recall the "3 R's" of neural network learning (Carpenter and Grossberg, 1988).

Reinforcement, notably reward and punishment, provides additional information in the form of environmental feedback based on the success of failure of actions triggered by a recognition event. Reward and punishment calibrate whether the action has or has not satisfied internal needs, which in the biological case include hunger, thirst, sex, and paid reduction, but may in machine applications include a wide variety of internal cost functions.

Reinforcement can shift attention to focus upon those recognition codes whose activation promises to satisfy internal needs based on past experience. A model to describe this aspect of reinforcement learning was described in Grossberg, (1982a, 1982b, 1984; reprinted in Grossberg, 1987a) and was supported by computer simulations in Grossberg and Levine (1987; reprinted in Grossberg, 1988). An attention shift due to reinforcement can also alter the structure and learning of recognition codes by amplifying (or suppressing) the STM activations, and hence the adjacent adaptive weights, of feature detectors that are active during positive (or negative) reinforcement.

Figure 14A:
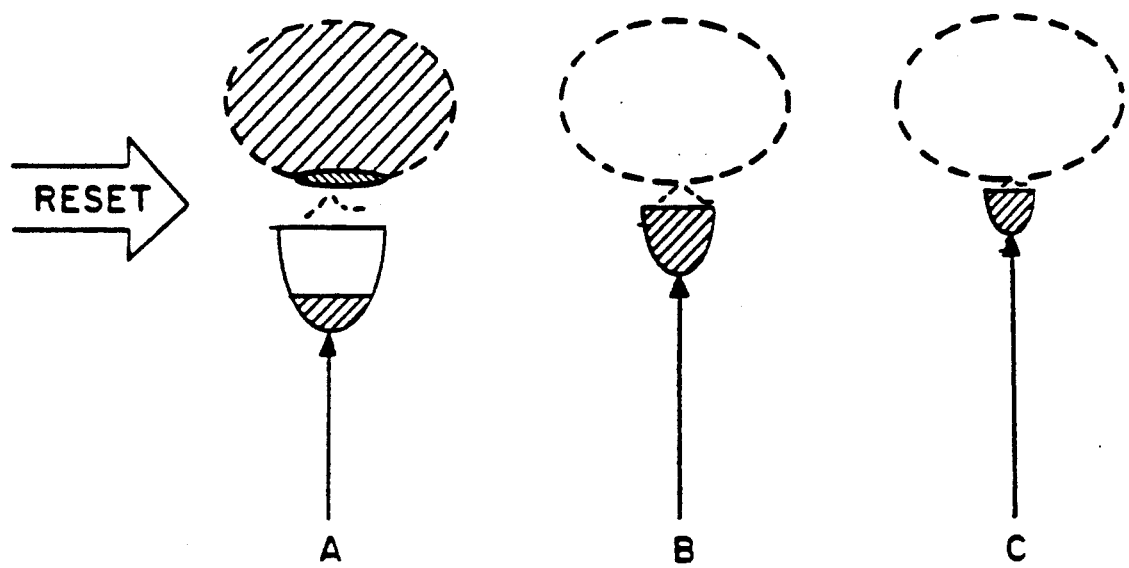
FIGS. 14a and 14b illustrate a search process with reinforcement reset overriding path weight bias.
Figure 14B:
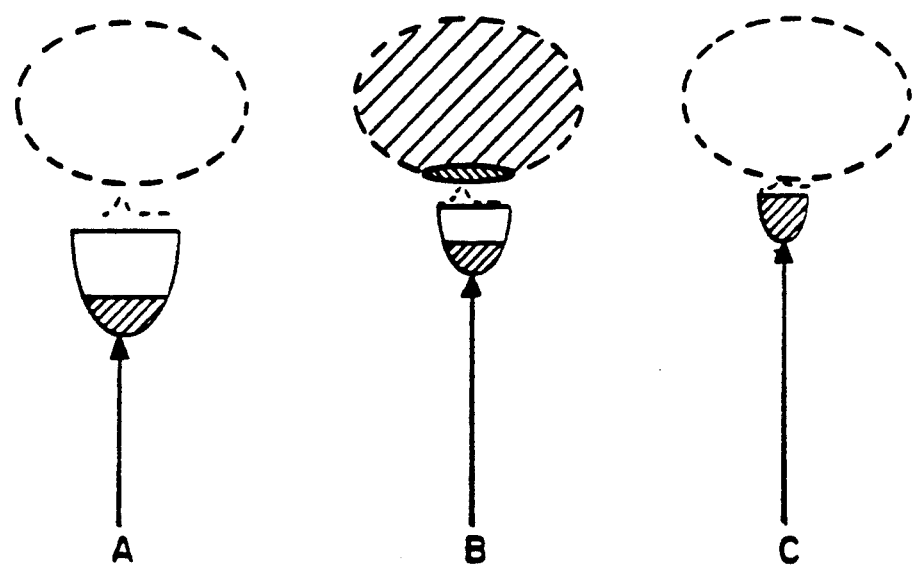

A reset wave may also be used to modify the pattern of STM activation in response to reinforcement. For example, both green and yellow bananas may be recognized as part of a single recognition category until reinforcement signals, contingent upon eating the bananas, differentiate them into separate categories. Within ART 3, such a reinforcement signal can alter the course of recognition learning by causing a reset event. The reset event may override a bias in either the learned path weights (FIGS. 14a and b) or in the input strengths (FIGS. 14a and b) that could otherwise prevent a correct classification from being learned. FIGS. 14a and b illustrate a system whose weights are biased toward feature A over feature B over feature C. In FIG. 14a, competition amplifies the weight bias in STM, leading to enhanced transmitter release of the selected feature A. In FIG. 14b, transmitter inactivation following reinforcement reset allows feature B to become active in STM.

Figure 15A:
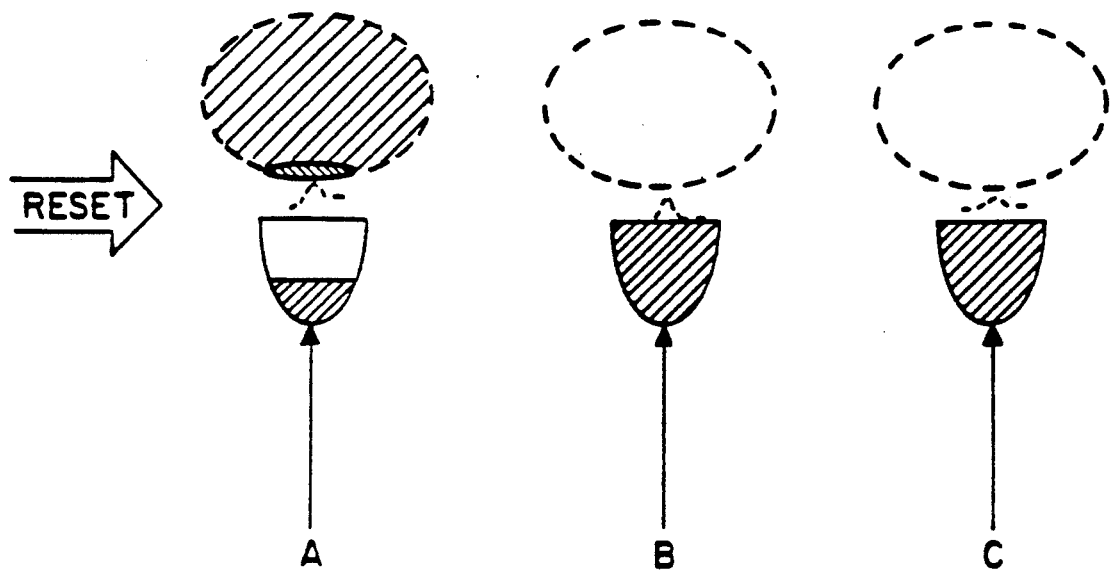
FIGS. 15a and 15b illustrate a search in which reinforcement reset overrides input bias.
Figure 15B:
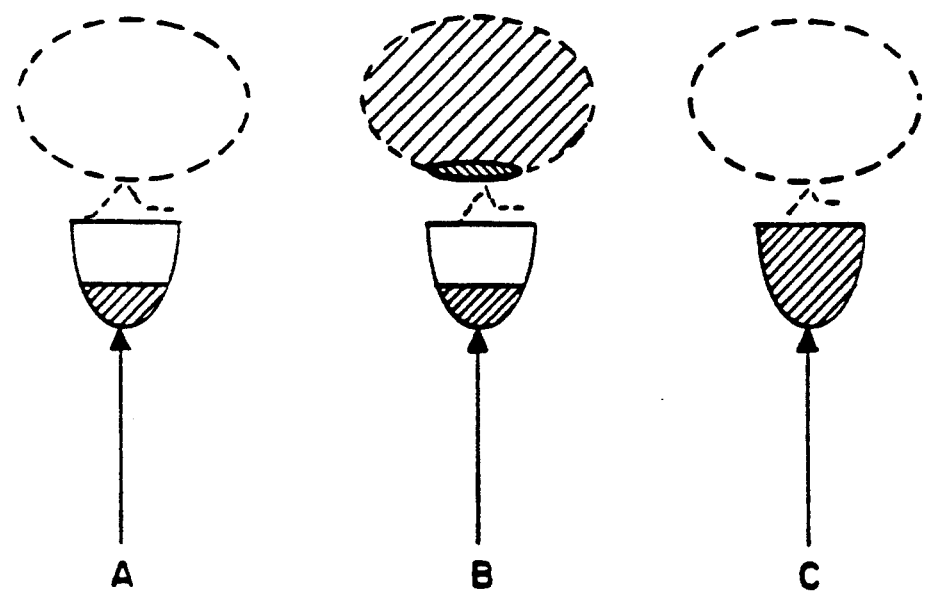

FIGS. 15a and b illustrate a system whose input signals are biased towards A over B over C. In FIG. 15a, competition amplifies the input bias in STM, leading to enhanced transmitter release of the selected feature A. In FIG. 15b, transmitter inactivation following reinforcement reset allows feature B to become active in STM.

For example, both green and yellow bananas may initially be coded in the same recognition category because features that code object shape (e.g., pathway A in FIGS. 14 and 15) prevent features that code object color (e.g., pathway B in FIGS. 14 and 15) from being processed in STM activities of these shape features until both shape and color features can simultaneously be processed, and thereby incorporated into different recognition codes for green bananas and yellow bananas.

In technological applications, such a reset wave can be implemented as a direct signal from an internal representation of a punishing event. The effect of the reset wave is to modify the spatial pattern of STM activation whose read-out into an overt action led to the punishing event. The adaptive weights, or LTM traces, that input to these STM activations are then indirectly altered by an amount that reflects the new STM activation pattern. Such a reinforcement scheme differs from the competitive learning scheme described by Kohonen (1984, p. 200), in which reinforcement acts directly, and by an equal amount, on all adaptive weights that lead to an incorrect classification.

Reinforcement may also act by changing the level of vigilance (Carpenter and Grossberg, 1987a, 1987b). For example, if a punishing event increases the vigilance parameter, then mismatches that were tolerated before will lead to a search for another recognition code. Such a code can help to distinguish pattern differences that were previously considered too small to be significant. Such a role for reinforcement is illustrated by computer simulations below.

All three types of reaction to reinforcement feedback may be useful in applications. The change in vigilance alters the overall sensitivity of the system to pattern differences. The shift in attention and the reset of active features can help to overcome prior coding biases that may be maladaptive in novel contexts.

TABLE 1

| NOTATION FOR ART 3 HIERARCHY | |
|---|---|
| $F_{field} = F_a$ | STM field a |
| $i = i_a = 1 \ldots n_a$ | node index, field a |
| $L = 1,2,3$ | index, 3 layers of an STM field |
| $x_i^{aL}$ | STM activity, input node i, layer L, field a |
| $y_i^{aL}$ | STM activity, output node i, layer L field a |
| $g^a(y_i^{aL}) = S_i^{aL}$ | signal function, field a |
| $p_k^a$ | parameter, field a, k = 1, 2, ... |
| $r_i^b$ | STM activity, reset node i. field b |
| $\rho^b$ | vigilance parameter, field b |
| $z_{ij}^{bc}$ | LTM trace, pathway from node i (field b) to node j (field c) |
| $u_{ij}^{bc}$ | intracellular transmitter, pathway from node i (field b) to node j (field c) |
| $v_{ij}^{bc}$ | released transmitter, pathway from |

TABLE 1-continued

| NOTATION FOR ART 3 HIERARCHY |
|---|
| node i (field b) to node j (field c) |

NOTATION FOR HIERARCHIES

Figure 16:
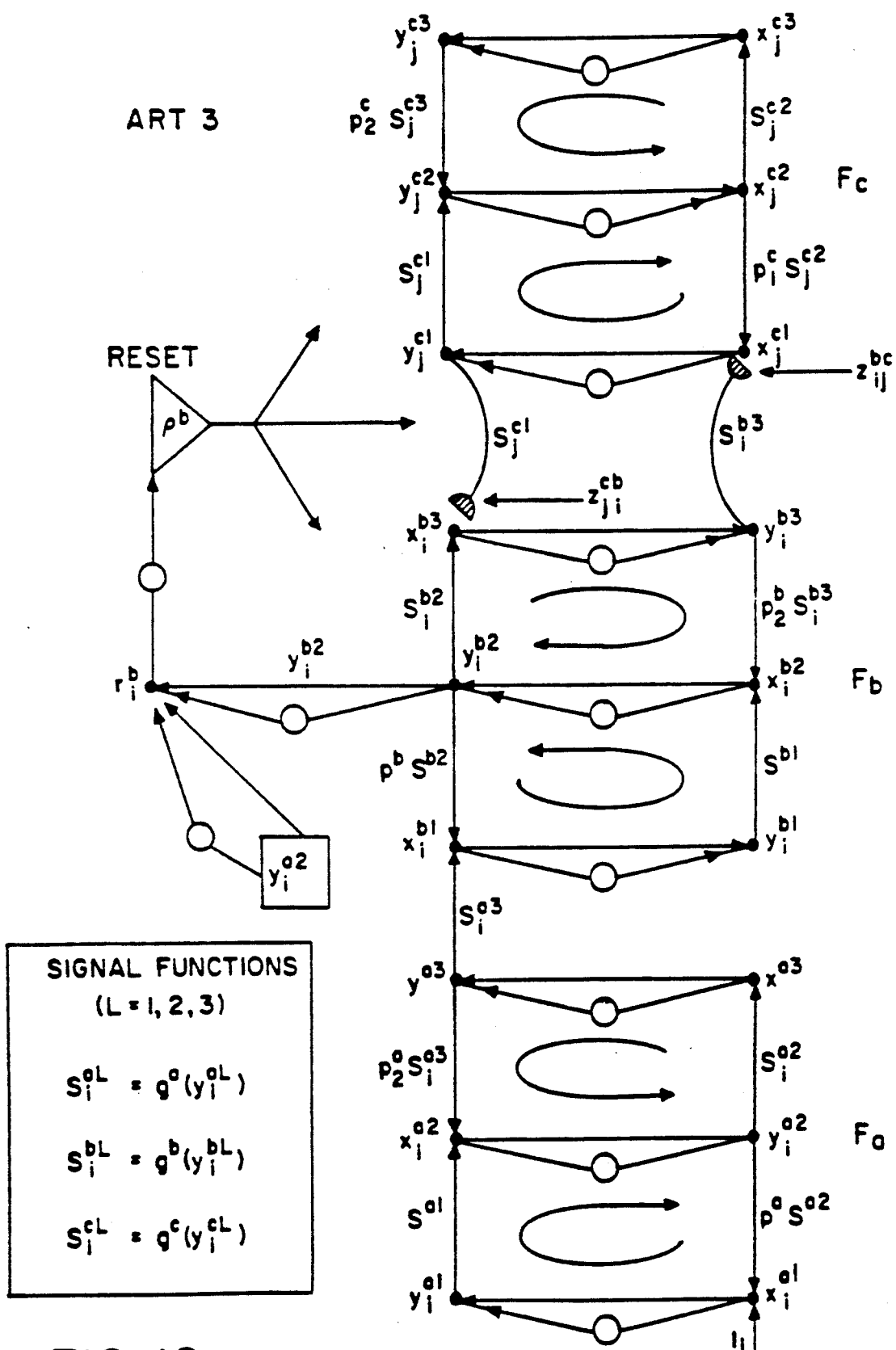
FIGS. 16 identifies the specific signals in a system embodying the present invention.

Table 1 and FIG. 16 illustrate notation suitable for an ART hierarchy with any number of fields $F_a, F_b, F_c \ldots$ This notation can also be adapted for related neural networks and algorithmic computer simulation.

Each STM variable is indexed by its field, layer, and node number. Within a layer, x denotes the activity of a node receiving inputs from other layers, while y denotes the (normalized) activity of a node that sends signals to other layers. For example, $x_i^{a2}$ denotes activity at the ith input node in layer 2 of field $F_a (i=1 \ldots n_a)$; and $y_i^{a2}$ denotes activity of the corresponding output node. Parameters are also indexed by field ($p_1^a, p_2^a, \ldots$), as are signal functions ($g^a$). Variable $r_i^b$ denotes activity of the ith reset node of field $F_b$, and $\rho^b$ is the corresponding vigilance parameter.

Variable z denotes an adaptive weight or LTM trace. For example, $z_{ij}^{bc}$ is the weight in the bottom-up pathway from the ith node of field $F_b$ to the jth node of field $F_c$. Variable $u_{ij}^{bc}$ and $v_{ij}^{bc}$ denote the corresponding presynaptic and bound transmitter quantities, respectively. Variables for the top-down pathways are $z_{ji}^{cb}$, $u_{ji}^{cb}$ and $v_{ji}^{cb}$. Complete simulation equations are specified below.

SIMULATIONS

The simulations in FIGS. 17-23 illustrate the dynamics of search in the ART 3 system shown in FIG. 16. The simulation time scale is assumed to be short relative to the time scale of learning, so all adaptive weights $z_{ij}^{bc}$ and $z_{ij}^{bc}$ are held constant. The weights are chosen, however, to illustrate a problem that can arise with slow learning or in any other situation in which weight vectors are not normalized at all times. Namely, a category whose weight vector only partially matches the input vector may become active because its weights are large. This can prevent initial selection of another category whose weight vector matches the input vector but whose weight magnitudes are small due, say, to a brief prior learning interval.

The search process allows the ART 3 system to reject an initial selection with large weights and partial pattern match, and then to activate a category with small weights and a better pattern match. As in ART 2, when weights are very small (nodes j=6,7, ..., FIG. 21) the ART system tolerates poor pattern matches in order to allow new categories to become established. During learning with resonance, the weights can become larger. The larger the weights, the more sensitive the ART system is to pattern mismatch (Carpenter and Grossberg, 1987b).

Figure 17A:
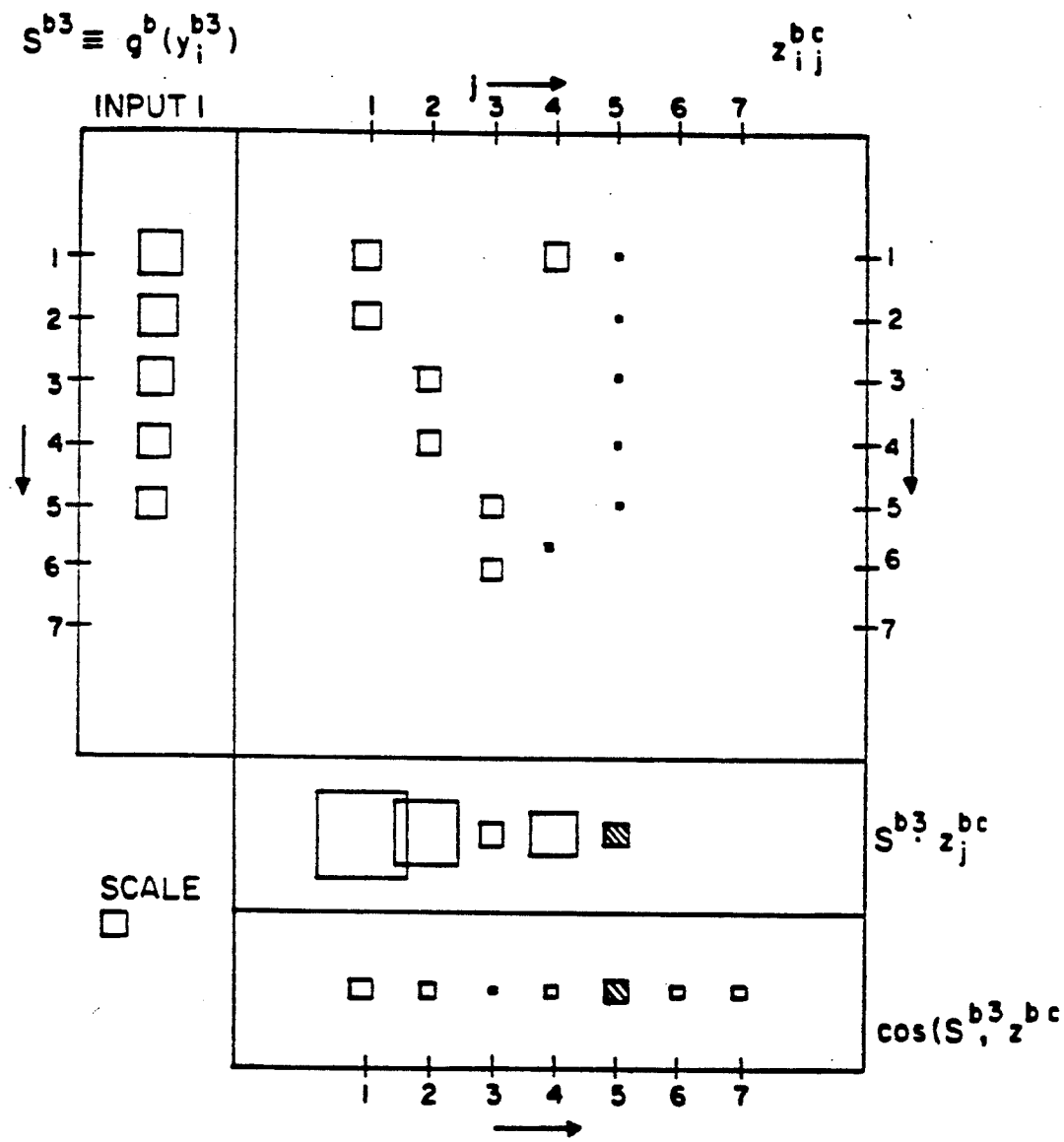
FIGS. 17a, 17b, 18a-c, 19a-c, 20a-c, 22a-c, and 23a-c illustrate the results of simulations performed using the present invention.
Figure 17B:
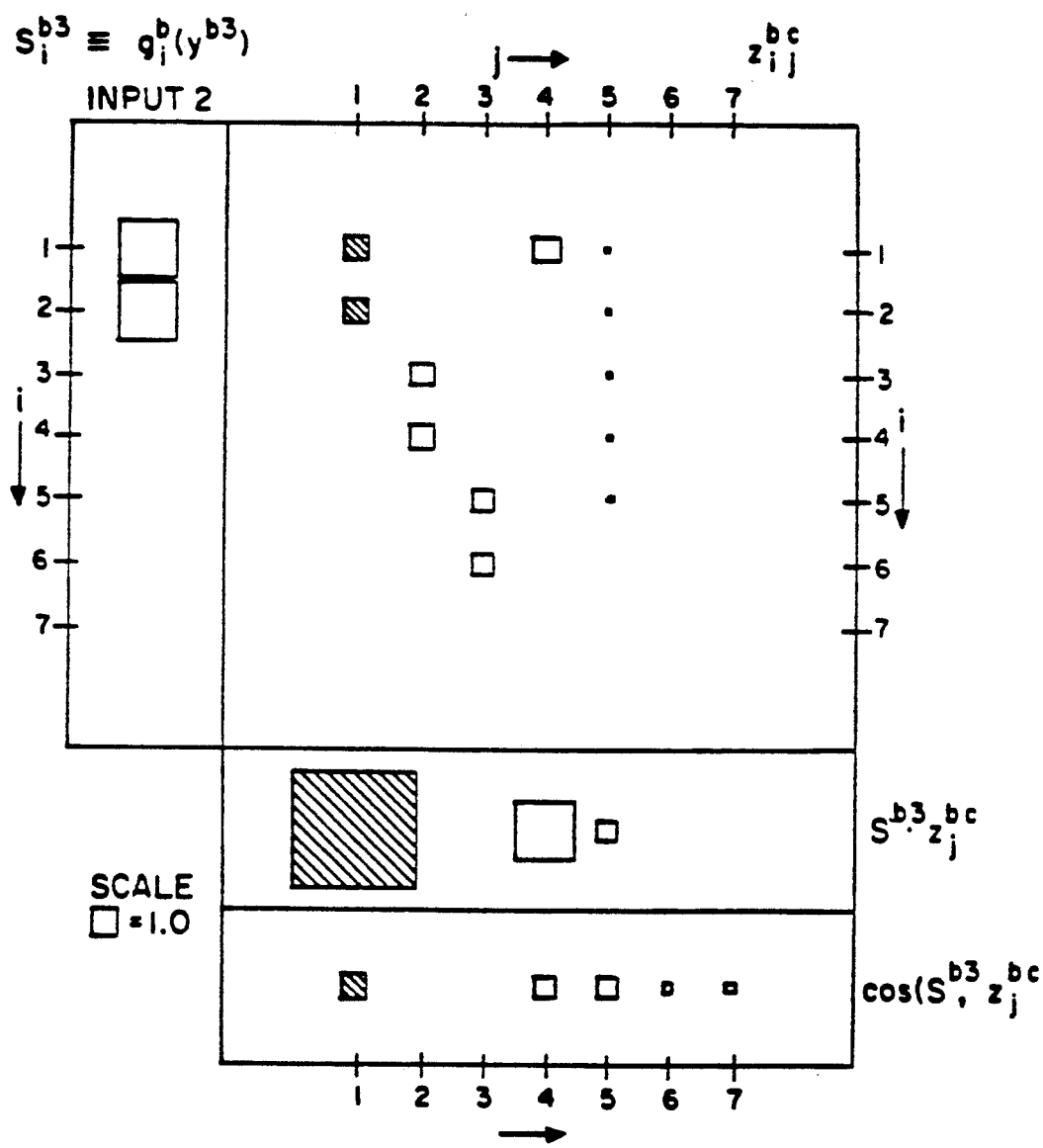

FIG. 17 illustrates the trade-off between weight size and pattern match in the system used in the simulations. The length of a side of the square centered at position i or j or (i,j) gives the value of a variable with the corresponding index. Shown are quantities $S_j^{b3}$, $z_{ij}^{bc}$, $S^{b3}$, and cos ($S^{b3}, z_j^{bc}$). In FIG. 17a Vector $S^{b3}$ is the signal response to Input 1 in the simulations. Vector $z_5^{bc}$ (filled squares) is parallel to $S^{b3}$, but $||z_5^{bc}||$ is small. Thus $S^{bc} \cdot z_5^{bc}$ is smaller than $S^{b3} \cdot z_j^{bc}$ for $j=1, 2,$ and 4, despite the fact that the cos ($S^{b3}, z_5^{bc}$) is maximal. In FIG. 17b Vector $S^{b3}$ is the signal response to Input 2 in the simulations. Vector $z_1^{bc}$ (filled squares) is parallel to $S^{b3}$. In FIGS. 17a and 17b, vector S illustrates the STM pattern stored in $F_a$ and sent from $F_a$ to $F_b$ when an input vector I is held constant. The $S_i$ values were obtained by presenting to $F_a$ an input function I with $I_i$ a linearly decreasing function of i. Vector S is also stored in $F_b$, as long as $F_c$ remains inactive. Initially S is the signal vector in the bottom-up pathways from $F_b$ to $F_c$. In FIG. 17a, $S_1 > S_2 > \ldots > S_5$; for $i = 6, 7 \ldots 15 (= n_a = n_b)$, $S_i$ is small. Each vector $z_1, z_2, z_3$, and $z_4$, plotted in columns within the square region of FIG. 17a, partially matches the signal vector S. These weights are significantly larger than the weights of vector $z_5$. However $z_5$ is a perfect match to S in the sense that the angle between the two vectors is 0:

$$\cos(S, z_5) = 1. \tag{16}$$

The relationship $$S \cdot z_j = ||S|| \, ||z_j|| \cos(S, z_j). \tag{17}$$

implies a trade-off between weight size, as measured by the length $||z_j||$ of $z_j$, and pattern match, as measured by the angle between S and $z_j$. If the initial signal from $F_b$ to $F_c$ is proportional to $S \cdot z_j$, as in (13), then the matched mode (j=5) may receive a net signal that is smaller than signals to other nodes. In fact, in FIG. 17a, $$S \cdot z_1 > S \cdot z_2 > S \cdot z_4 > S \cdot z_5 > \ldots \tag{18}$$

FIG. 17b shows a signal vector S that is parallel to the weight vector $z_1$.

The computer simulations summarized in FIGS. 18–21 use the inputs described in FIG. 17 to illustrate the search process in an ART 3 system. In these simulations, the $F_c$ competition parameters were chosen to make a choice; hence, only the node receiving the largest filtered input from $F_b$ is stored in STM. The signal function of $F_c$ caused the STM field to make a choice. In FIG. 22 a different signal function at $F_c$, similar to the one used in $F_a$ and $F_b$, illustrates how the search process reorganizes a distributed recognition code. The simulations show how, with high vigilance, the ART search process rapidly causes a series of mismatch resets that alter the transmitter vectors $u_1, u_2, \ldots$ until $S \cdot u_5$ becomes maximal. Once node j=5 becomes active in STM it amplifies transmitter release. Since the pattern match is perfect, no further reset occurs while Input 1 (FIG. 17a) remains on. Input reset is illustrated following an abrupt or gradual switch to Input 2 (FIG. 17b).

Each simulation figure illustrates three system variables as they evolve through time. The time axis (t) runs from the top to the bottom of the square. A vector pattern, indexed by i or j, is plotted horizontally at each fixed time. Within each square, the value of a variable at each time is represented by the length of a side of a square centered at that point. In each figure, part (a) plots $y_j^c$, the normalized STM variables at layer 1 of field $F_c$. Part (c) plots $\Sigma_j v_{ij}^{bc}$, the total amount of transmitter released, bottom-up, in paths from all $F_b$ nodes to the jth $F_c$ nodes to the ith $F_b$ node. The ART Search Hypothesis 1 implies that the net bottom-up transmitter pattern in part (b) reflects the STM pattern of $F_c$ in part (a); and that the net top-down transmitter pattern in part (c) reflects the STM pattern of $F_b$.

In FIG. 18, the vigilance parameter is high and fixed at the value $$\rho = 0.98. \tag{19}$$

Figure 18A:
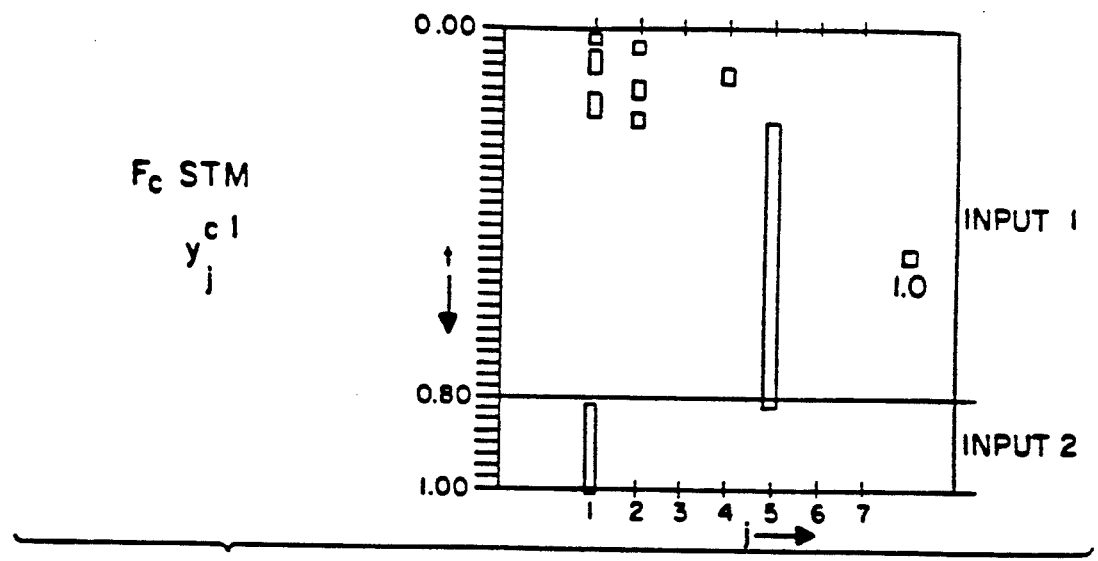

For $0 \leq t < 0.8$, the input (FIG. 17a) is constant. The high vigilance level induces a sequence of mismatch resets, alternating among the category nodes j=1,2, and 4 (FIG. 18a), each of which receives an initial input larger than the input to node j=5 (FIG. 17a). At t=0.125, the $F_c$ node j=5 is selected by the search process (FIG. 18a). It remains active until t=0.8. then, the input from $F_a$ and the old reverberating STM pattern at $F_b$ leads to an input reset (FIGS. 13 and 18). The ART Search Hypothesis 2 implies that bound transmitter is inactivated and the STM feedback loops in $F_b$ and $F_c$ are thereby inhibited. The new input pattern immediately activates its category node j=1, despite some previous depletion at that node (FIG. 18a).

Figure 18B:
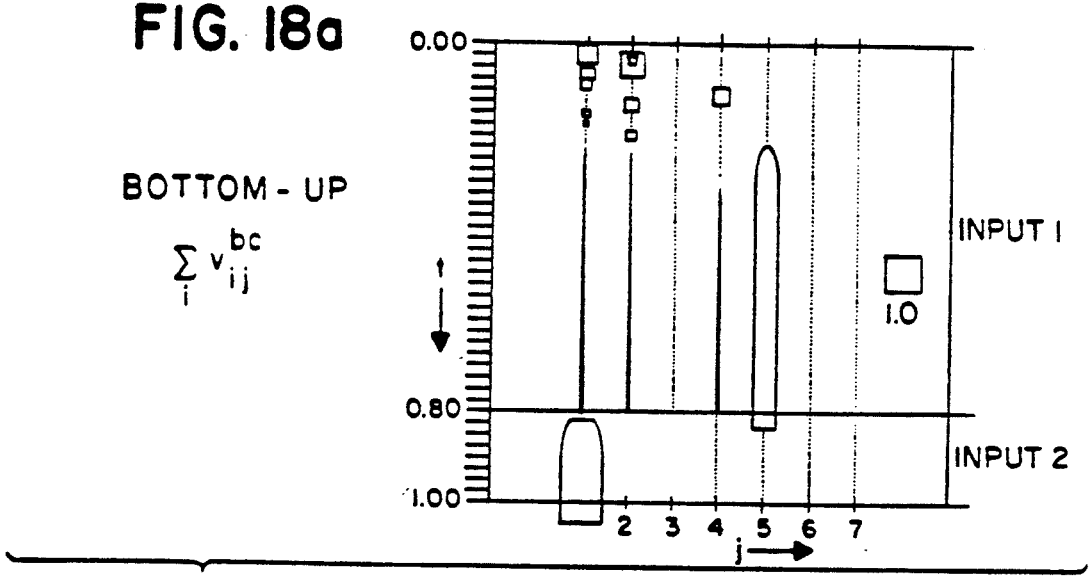
Figure 18C:
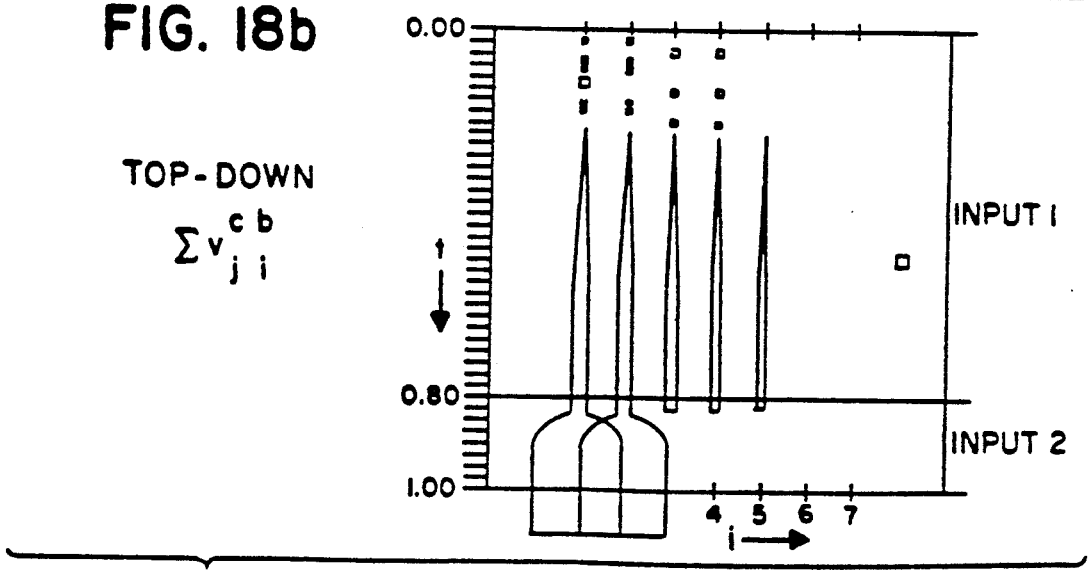

Large quantities of transmitter are released and bound only after STM resonance is established. In FIG. 18b, large quantities of bottom-up transmitter are released at the $F_c$ node j=5 in the time interval $0.215 < t < 0.8$, and at node j=1 in the time interval $0.8 < t < 1$. In FIG. 18c, the pattern of top-down bound transmitter reflects the resonating matched STM pattern at $F_b$ due to Input 1 at times $0.215 < t < 0.8$ and due to Input 2 at times $0.8 < t < 1$.

FIG. 19 shows the dynamics of the same system as in FIG. 19 but at the lower vigilance value $$\rho = 0.94. \tag{20}$$

Figure 19A:
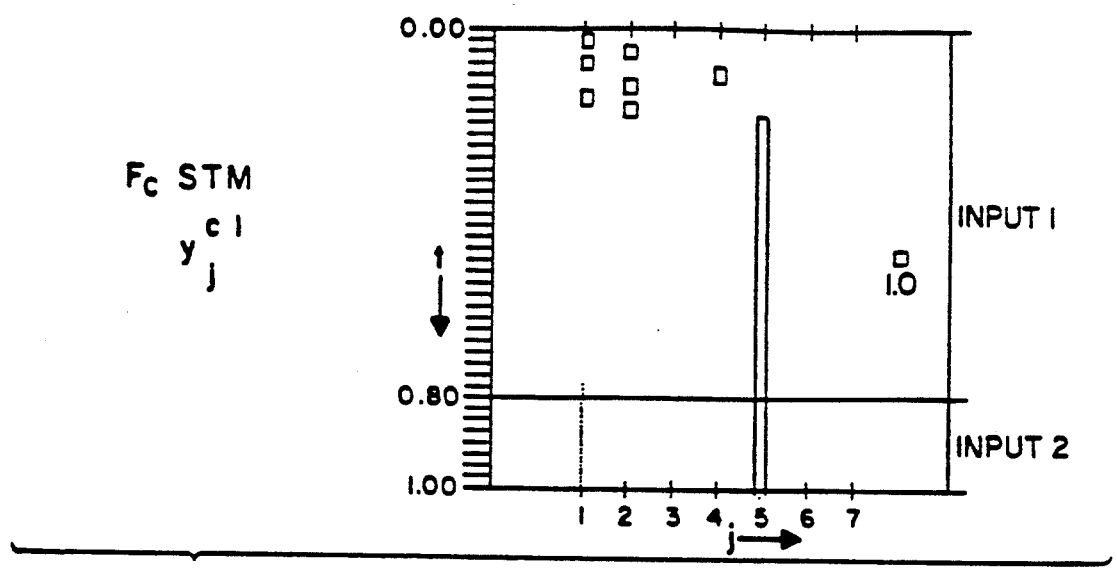
Figure 19B:
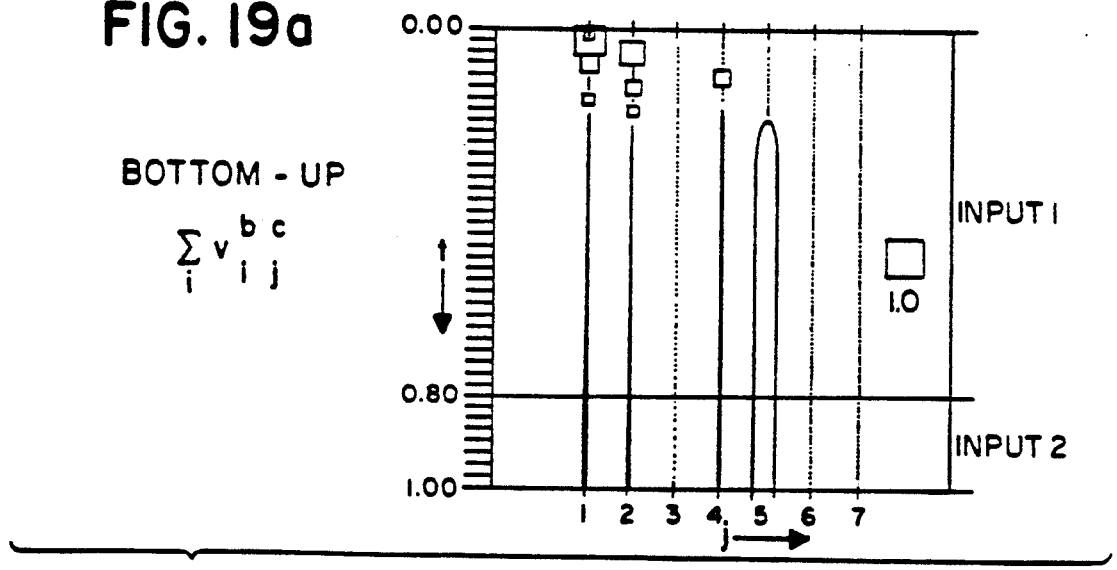

The $F_c$ node j=5 becomes active slightly sooner (t=0.19, FIG. 17a) then it does in FIG. 19a, where $\rho = 0.98$. At a lower vigilance, more transmitter needs to be released before the system reacts to a mismatch so that each "erroneous" category node is active for a longer time interval than at higher vigilance. When $\rho = 0.98$ (FIG. 18b), node j=1 is searched 5 times. When $\rho = 0.94$ (FIG. 19b), node j=1 is searched only 3 times, but more transmitter is released during each activation/reset cycle than at comparable points in FIG. 18b. Inactivation of this extra released transmitter approximately balances the longer times to reset. hence the total search time remains approximately constant over a wide range of vigilance parameters. In the present instance, the nonlinearities of transmitter release terminate the search slightly sooner at lower vigilance.

Figure 19C:
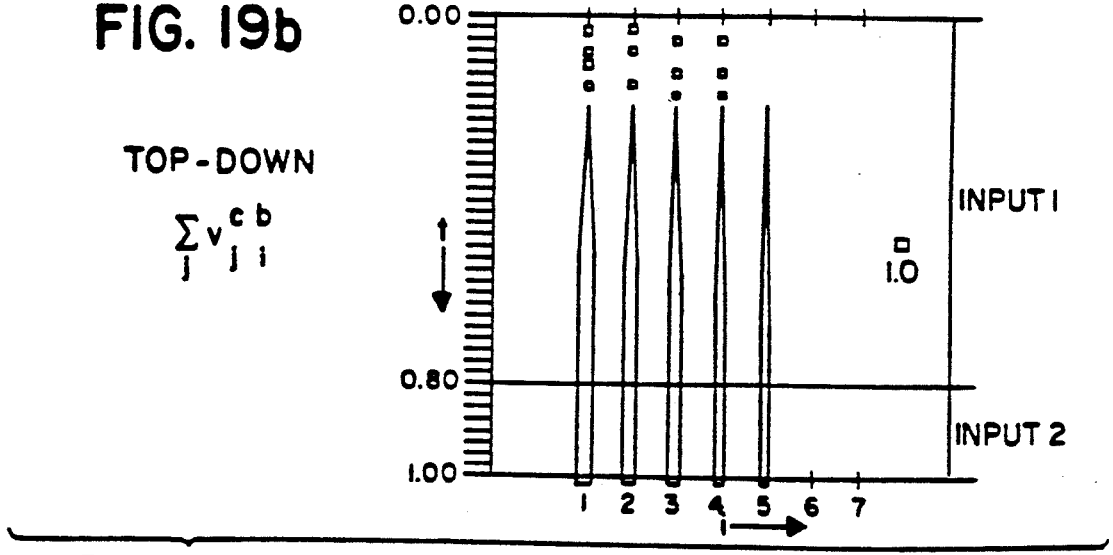

FIG. 19a illustrates another effect of lower vigilance: the system's ability to tolerate larger mismatches without causing a reset. When the input changes at t=0.8, the mismatch between the input pattern at $F_a$ and the resonating pattern at $F_b$ is not great enough to cause an input reset. Despite bottom-up input only to nodes i=1,2, the strong resonating pattern at nodes $i = 1 \ldots 4$ maintains itself in STM at $F_b$ (FIG. 19c).

Figure 20A:
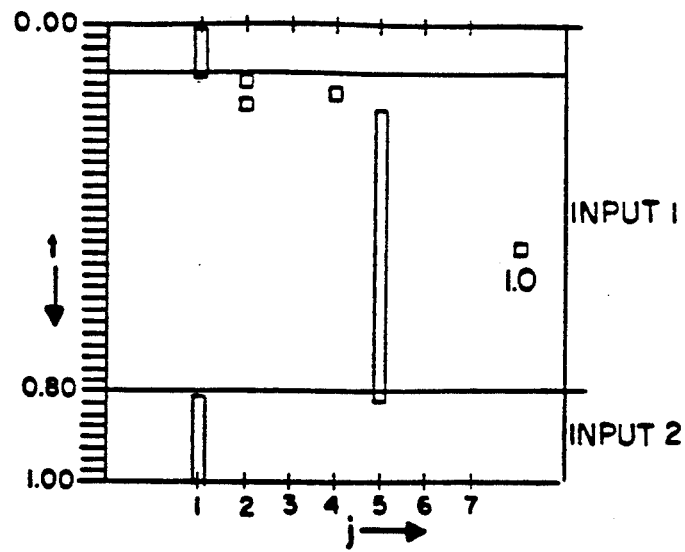
Figure 20B:
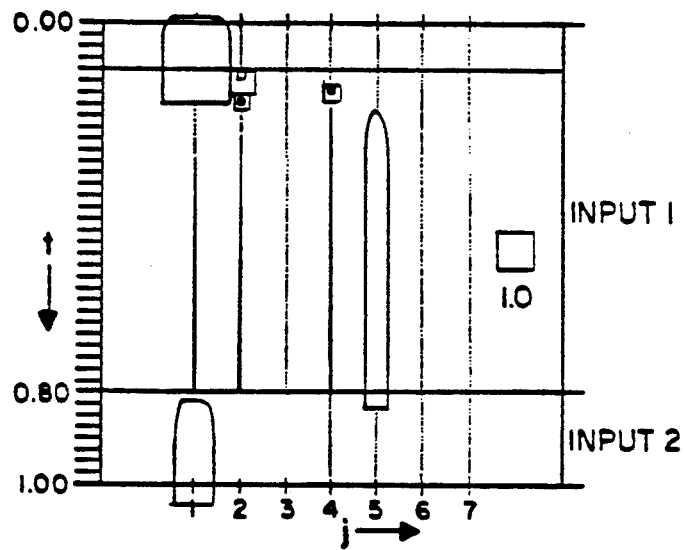

In FIG. 26 vigilance is initially set at value $$\rho = 0.9, \tag{21}$$

in the time interval $0 < t < 0.1$. At this low vigilance level, the STM pattern of $F_b$ does not experience a mismatch reset series. Node j=1 is chosen and resonance immediately ensure (FIG. 20a), as is also reflected in the amplification of transmitter release (FIG. 20b). The simulation illustrates a case where this choice of category leads to external consequences, including reinforcement (Section 17), that feed back to the ART 3 moduel. This reinforcement teaching signal is assumed to cause vigilance to increase to the value $$\rho=0.98 \qquad (22)$$

for times $t \geq 0.1$. This change triggers a search that ends at node $j=5$, at time $t=0.19$. Note that, as in FIG. 19, enhanced depletion of transmitter at $j=1$ shortens the total search time. In FIG. 22, where $\rho$ also equals 0.98, the search interval has length 0.215; in FIG. 20, the search interval has length 0.09, and the system never again activates node $j=1$ during search.

Figure 20C:
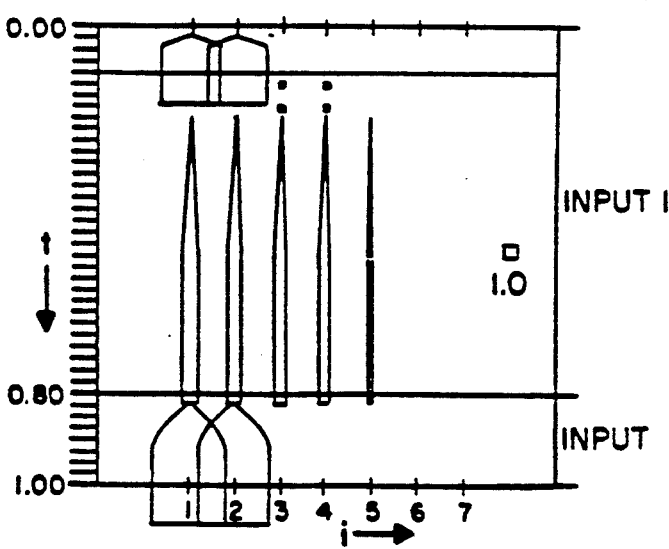
Figure 21A:
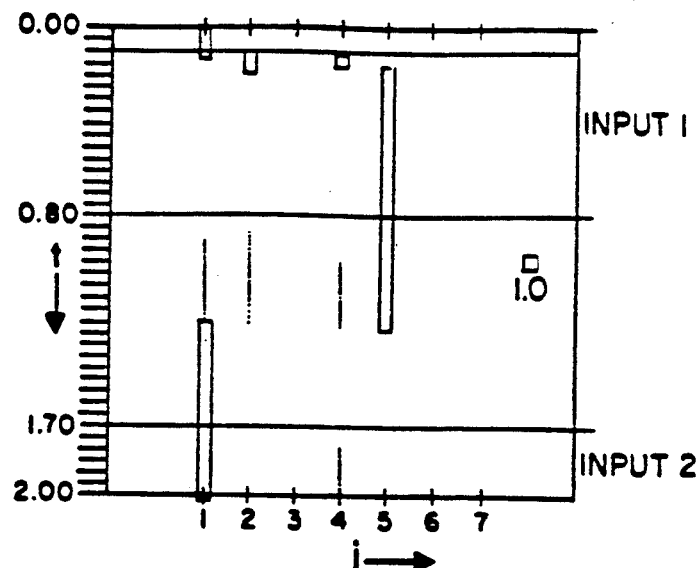
Figure 21B:
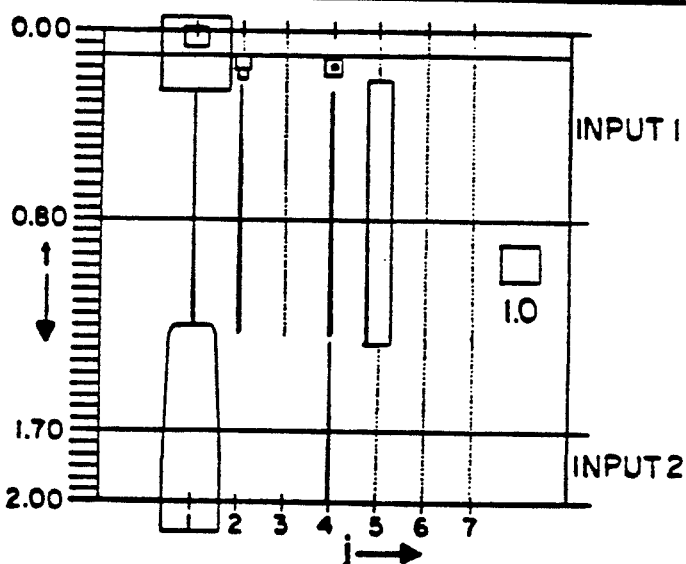
Figure 21C:
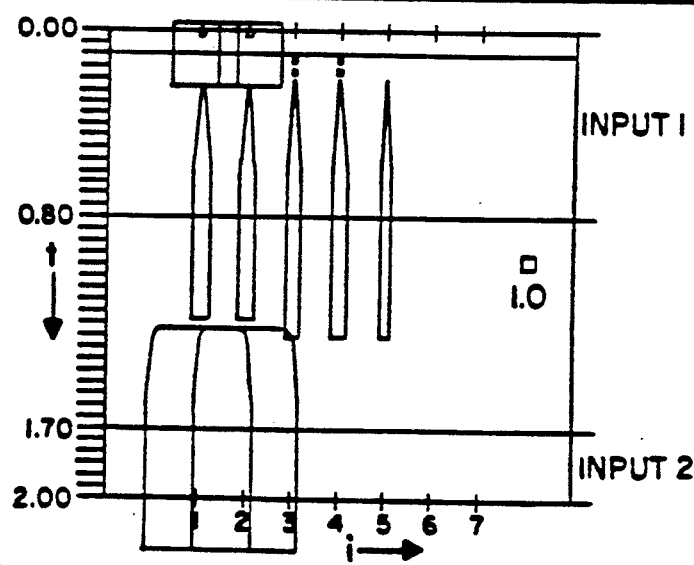

The simulation illustrated in FIG. 21 is nearly the same as in FIG. 20, with $\rho=0.9$ for $0 \leq t < 0.1$ and $\rho=0.98$ for $t > 0.1$. However, at $t=0.8$, Input 1 starts to be slowly deformed into Input 2, rather than being suddenly switched, as in FIG. 24. The $F_a \rightarrow F_b$ input vector becomes a convex combination of Input 1 and Input 2 that that starts as Input 1 ($t \leq 0.8$) and is linearly shifted to Input 2 ($t \geq 1.7$). Despite the gradually shifting input, node $j=5$ remains active until $t=1.28$. Then an input reset immediately leads to activation of node $j=1$, whose weight vector matches Input 2. Competition in the category representation field $F_c$ causes a history-dependent choice of one category or the other, not a convex combination of the two.

Issues of learning and code interpretation are subtle and complex when a code is distributed. However, the ART 3 search mechanism translates immediately into this context. The simulation in FIG. 22 illustrates how search operates on a distributed code. The only difference between the ART 3 system used for these simulations and the one used for FIGS. 18-21 is in the signal function at $F_c$. In FIGS. 18-21, a choice is always made at field $F_c$. The signal function for FIG. 21 is, like that at $F_a$ and $F_b$, piecewise linear: 0 below a threshold, linear above. With its fairly high threshold, this signal function compresses the input pattern; but the compression is not so extreme as to lead inevitably to choice in STM.

Figure 22A:
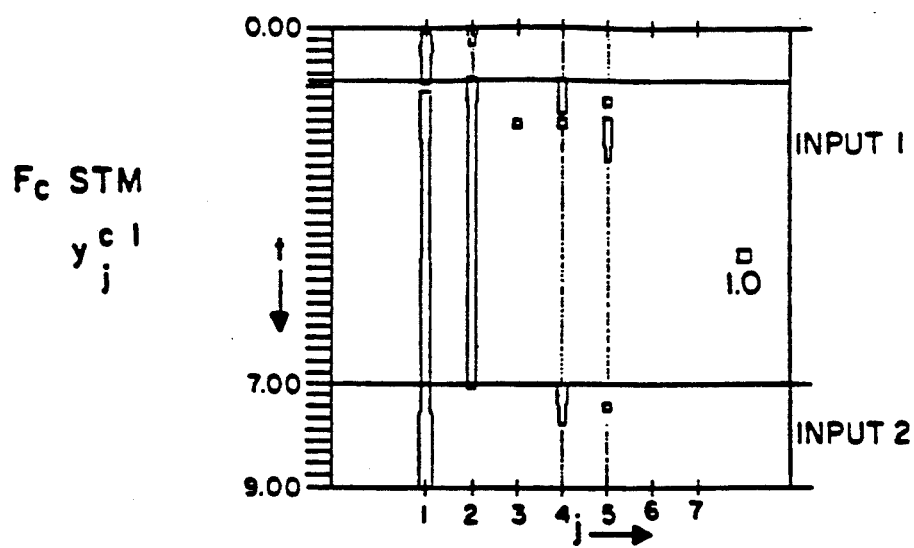
Figure 22B:
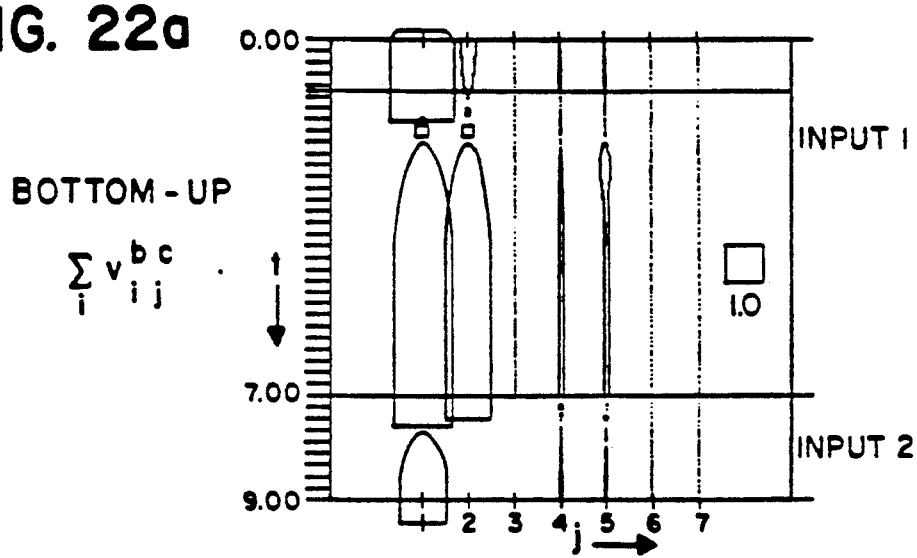
Figure 22C:
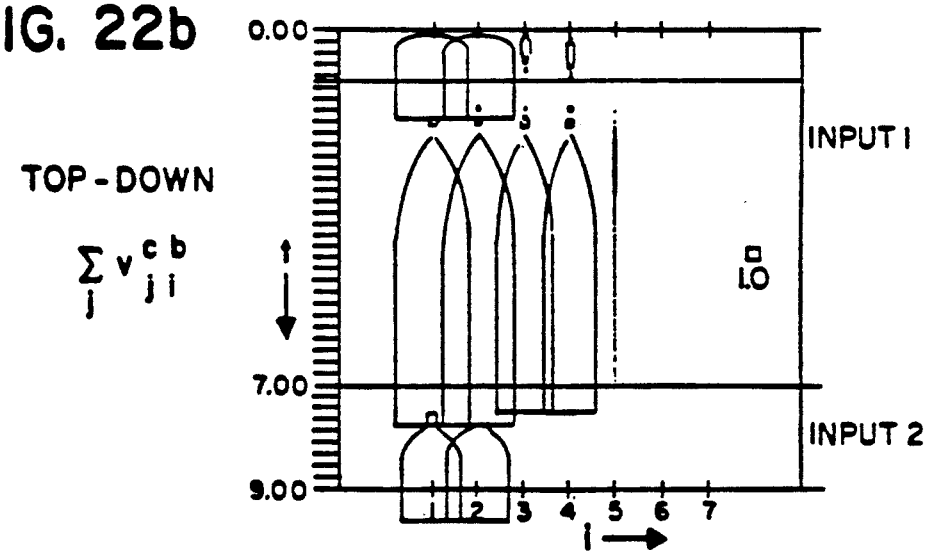

Distributed code STM activity is shown in FIG. 22a. At a given time more than one active node may represent a category (2.6 < t < 7), or one node may be chosen (7.7 < t ≤ 9).

Figure 23A:
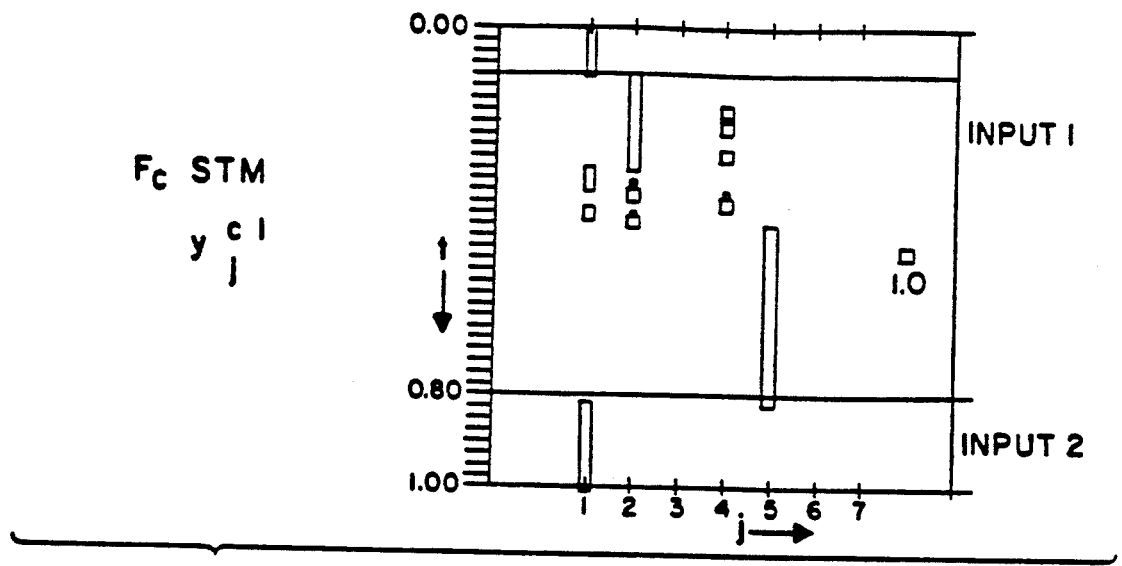
Figure 23B:
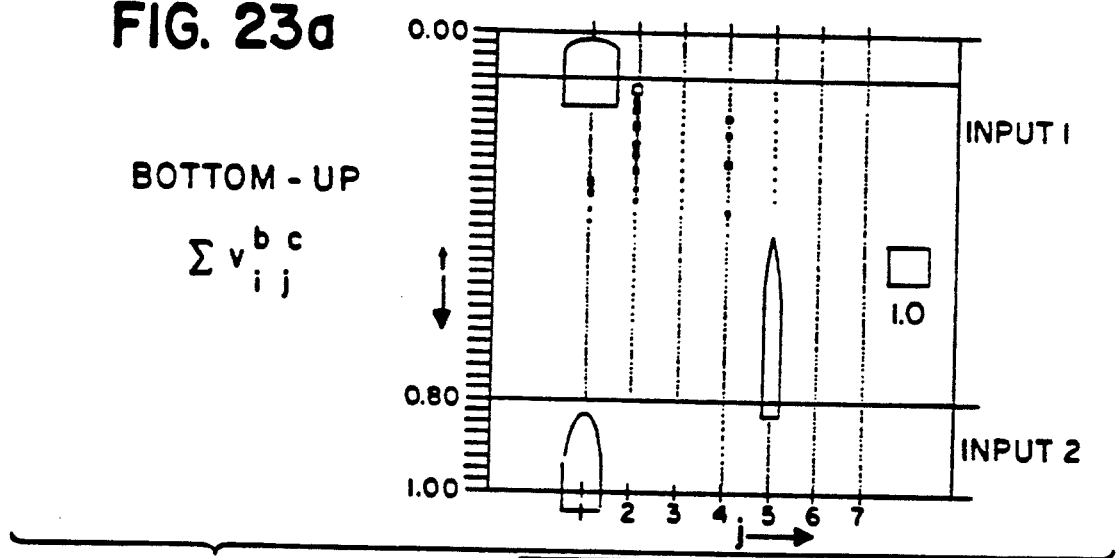
Figure 23C:
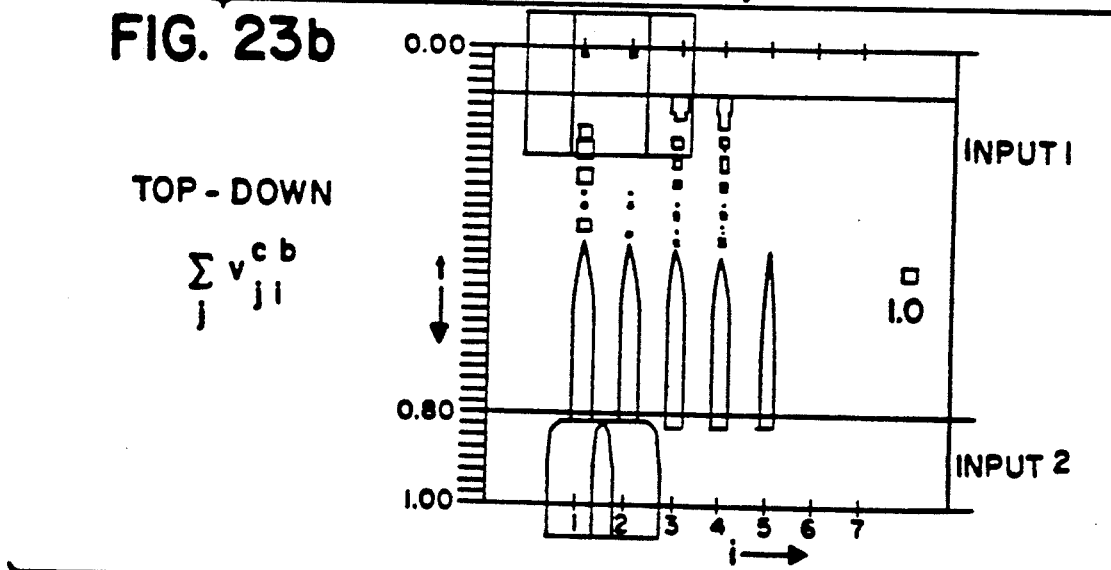

ART 3 system satisfy the small number of design constraints described above. In addition ART 3 satisfies the ART 2 stability constraints (Carpenter and Grossberg, 1987b). For example, top-down signals need to be an order of magnitude larger than bottom-up signals, all other things being equal, as illustrated below by equation (24) and parameters $p_1$ and $p_2$ in Table 4 and equations (31) and (34). At least some of the STM fields need to be competitive networks. However, many versions of the ART systems exist within these boundaries. A simulation of one such system is illustrated in FIG. 23-27, which duplicates the conditions on $\rho$ and input patterns of FIG. 21. However, the system that generated in FIG. 23 uses a different version of the ART 3 STM field $F_c$ than the one described in the simulation equations section below. In particular, in the STM equation (3), $B > 0$. STM nodes can thus be hyperpolarized, so that $x_j < 0$, by intrafield inhibitory inputs. The transmitter release function $f(x_j)$ (equation (9)) equals 0 when $x_j$ is sufficiently hyperpolarized. The system of FIG. 23 thus has the property that transmitter release can be terminated at nodes that become inactive during the STM competition. Since $f(0)$ needs to be positive in order to allow transmitter release to begin, low-level transmitter release by nodes without significant STM activity is unavoidable if nodes cannot be hyperpolarized. FIG. 23 shows that a competitive STM field with hyperpolarization gives search and resonance results similar to those of the other simulations.

Similarly, considerable variations in parameters also give similar results.

SIMULATION EQUATIONS

Simulation equations are described in an algorithmic form to indicate the steps followed in the computer program that generated FIGS. 18-22.

The simulation time scale is fixed by setting the rate of transmitter accumulation equal to 1. The intrafield STM rate is assumed to be significantly faster, and the LTM rate significantly slower. Accordingly, STM equations are iterated several times each time step; and LTM weights are held constant. The simulation time step is $$\Delta t = 0.005. \qquad (23)$$

Transmitter variables u and v are integrated by first order approximation (Euler's method). The IMSL Gear package gives essentially identical solutions but requires more computer time.

The bottom-up LTM weights $z_{ij}^{bc}$ illustrate in FIG. 22 are specified in Table 2. At "uncommitted" nodes ($j \geq 6$) $z_{ij}^{bc} = 0.001$. Top-down LTM weights $z_{ji}^{cb}$ are constant multiples of corresponding $z_{ij}^{bc}$ weights:

$$z_{ji}^{cb} = 10 \cdot z_{ij}^{bc} \qquad (24)$$

TABLE 2

LTM WEIGHTS $z_{ij}^{bc}$

| j → | | | | | | | |
|---|---|---|---|---|---|---|---|
| 1 | 2 | 3 | 4 | 5 | 6 | | |
| 1.0 | 0.0 | 0.0 | 1.0 | 0.176 | 0.0001 | 1 | i |
| 1.0 | 0.0 | 0.0 | 0.0 | 0.162 | 0.0001 | 2 | ↓ |
| 0.0 | 0.9 | 0.0 | 0.0 | 0.148 | 0.0001 | 3 | ↓ |
| 0.0 | 0.9 | 0.0 | 0.0 | 0.134 | 0.0001 | 4 | ↓ |
| 0.0 | 0.0 | 0.8 | 0.0 | 0.120 | 0.0001 | 5 | ↓ |
| 0.0 | 0.0 | 0.8 | 0.0 | 0.0 | 0.0001 | 6 | ↓ |
| 0.0 | 0.0 | 0.0 | 0.0 | 0.0 | 0.0001 | 7 | ↓ |
| . | . | . | . | . | . | | |
| . | . | . | . | . | . | | |

$i = 1 \ldots n_a = n_b = 15$
$j = 1 \ldots n_c = 20$

This choice of LTM weights approximates a typical state of an ART system undergoing slow learning. Weights do not necessarily reach equilibrium on each presentation, but while the $J^{th} F_c$ node is active, $$z_{Ji}^{cb} \rightarrow x_i^{b3} \qquad (25)$$

and $$z_{iJ}^{bc} \rightarrow S_i^{bc}. \qquad (26)$$

Given the parameters specified below, as STM and LTM variables approach equilibrium, $$x_i^{b3} = 10 \cdot S_i^{b3}. \qquad (27)$$

Equations (25)-(27) imply that equation (24) is a good approximation of a typical weight distribution.

Initially, $$u_{ij}^{ac}(0) = z_{ij}^{ac} \tag{28}$$

and $$u_{ij}^{cb}(0) = z_{ji}^{cb}. \tag{29}$$

All other initial values are 0.

The $F_b$ input values $(S_i^{a3})$ are specified in Table 3.

TABLE 3

$F_a \rightarrow F_b$ INPUT VALUES $(S_i^{a3})$

| i | INPUT 1 | INPUT 2 |
|---|---------|---------|
| 1 | 1.76 | 2.36 |
| 2 | 1.62 | 2.36 |
| 3 | 1.48 | 0.0 |
| 4 | 1.34 | 0.0 |
| 5 | 1.20 | 0.0 |
| 6 | 0.0 | 0.0 |
| 7 | 0.0 | 0.0 |
| . | . | . |

TABLE 4

PARAMETERS

$$p_1^a = p_1^b = p_1^c = 10.0$$
$$p_2^a = p_2^b = p_2^c = 10.0$$
$$p_3^a = p_3^b = p_3^c = 0.0001$$
$$p_4^c = 0.9$$
$$p_5^b = p_5^c = 0.1$$
$$p_6^b = p_6^c = 1.0$$

SIGNAL FUNCTIONS $g^a, g^b, g^c$

| $F_a, F_b$ DISTRIBUTED | $F_c$ CHOICE | $F_c$ DISTRIBUTED |
|---|---|---|
| $p_7^a = p_7^b = 0.0$ | $p_7^c = 1/\sqrt{n_c}$ | $p_7^c = 0.0$ |
| $p_8^a = p_8^b{}^I = 0.3$ | $p_8^c = 0.2$ | $p_8^c = 0.4$ |

| DISTRIBUTED | CHOICE |
|---|---|
| $g(w) = \begin{cases} 0 & \text{if } w \le p_7 + p_8 \\ \left(\dfrac{w-p_7}{p_8}\right) & \text{if } w > p_7 + p_8 \end{cases}$ | $g(w) = \begin{cases} 0 & \text{if } w \le p_7 \\ \left(\dfrac{w-p_7}{p_8}\right)^2 & \text{if } w > p_7 \end{cases}$ |

All simulations start with Input 1. Several of the simulations switch to Input 2 either with a jump or gradually. Input 1 values are obtained by presenting a linear, decreasing function $I_i$ to $F_a$. Input 2 values are obtained by setting $I_1 = I_2 = 1$ and $I_i = 0 (i \ge 3)$.

Implicit in this formulation is the assumption that a changing input vector $I$ can register itself at $F_a$. This requires that STM at $F_a$ be frequently "reset." Otherwise new values of $I_i$ may go unnoticed, due to strong feedback within $F_a$. Feedback within $F_b$ allows the STM to maintain resonance even with fluctuating amplitudes at $F_a$.

Except during reset, equations used to generate the STM values for FIGS. 22-26 are similar to the ART 2 equations (Carpenter and Grossberg, 1987b). Dynamics of the fields $F_a, F_b$, and $F_c$ are homologous, as shown in FIG. 26. Steady-state variables for the field $F_b$, when the reset signal equals 0, are given by equations (31)-(36). Similar equations hold for fields $F_a$ and $F_c$.

Layer 1, input variable $$\epsilon \frac{dx_i^{b1}}{dt} = -x_i^{b1} + S_i^{a3} + p_1^b S_i^{b2}. \tag{30}$$

In steady state, $$x_i^{b1} = S_i^{a3} + p_1^b S_i^{b2}. \tag{31}$$

Table 4 specifies parameter $p_1^b, p_2^b, \ldots$ values and the signal function $$g^b(y_i^{bL}) = g_i^{bL} \tag{32}$$

for layer $L = 1,2,3$. Equation (31) is similar to the simplified STM equation (6), with $z_i^{b1}$ equal to the sum of an interfield input $(g_i^{a3})$ and an intrafield input $(p_i^b, S_i^{b2})$.

Layer 1, output variable $$y_i^{b1} = \frac{x_i^{b1}}{p_3^b + \|x^{b1}\|}. \tag{33}$$

Layer 2, input variable
$$x_i^{b2} = S_i^{b1} + p_2^b S_i^{b3} \tag{34}$$

Layer 2, output variable $$y_i^{b2} = \frac{x_i^{b2}}{p_3^b + \|x^{b2}\|} \tag{35}$$

Layer 3, input variable $$x_i^{b3} = S_i^{b2} + p_4^c \sum_j v_{ji}^{cb} \tag{36}$$

Layer 3, output variable $$y_i^{b3} = \frac{x_i^{b2}}{p_3^b + \|x^{b2}\|} \tag{37}$$

Normalization of the output variables in equations (33), (35), and (37) accomplishes two goals. First, since the nonlinear signal function $g^b$ in equation (32) has a fixed threshold, normalization is needed to achieve orderly pattern transformations under variable processing loads. This goal could have been reached with other norms, such as the $L^1$ norm ($|x| = \Sigma_i x_i$). The second goal of normalization is to allow the patterns to have direct access to category representations, without search, after the code has stabilized (Carpenter and Grossberg, 1987a, 1987b). Equations (13) and (17) together tie the Euclidean norm to direct access in the present model. If direct access is not needed, or if another measure of similarity of vectors is used, the Euclidean norm may be replaced by $L^1$ or another norm.

When the reset signal equals 0, levels of presynaptic and bound transmitter are governed by equations of the form (1) and (5), as follows.

Presynaptic transmitter, $F_b \rightarrow F_c$ $$\frac{du_{ij}^{bc}}{dt} = (z_{ij}^{bc} - u_{ij}^{bc}) - u_{ij}^{bc}\rho_5{}^b(x_j^{c1} + \rho_6{}^c)S_i^{b3} \quad (38)$$

Bound transmitter, $F_b \rightarrow F_c$ $$\frac{dv_{ij}^{bc}}{dt} = -v_{ij}^{bc} + u_{ij}^{bc}\rho_5{}^c(x_j^{c1} + \rho_6{}^c)S_i^{b3} \quad (39)$$

Presynaptic transmitter, $F_c \rightarrow F_b$ $$\frac{du_{ji}^{cb}}{dt} = (z_{ji}^{cb} - u_{ji}^{cb}) - u_{ji}^{cb}\rho_5{}^b(x_i^{b3} + \rho_6{}^b)S_j^{c1} \quad (40)$$

Bound transmitter, $F_c \rightarrow F_b$ $$\frac{dv_{ji}^{cb}}{dt} = -v_{ji}^{cb} + u_{ji}^{cb}\rho_5{}^b(x_i^{b3} + \rho_6{}^b)S_j^{c1} \quad (41)$$

Note that equations (38) and (39) imply that $$u_{ij}^{bc} + v_{ij}^{bc} \rightarrow z_{ij}^{bc} \quad (42)$$

and equations (40) and (41) imply that $$u_{ji}^{cb} + v_{ji}^{cb} \rightarrow z_{ji}^{cb}. \quad (43)$$

Reset occurs when patterns active at $F_a$ and $F_b$ fail to match according to the criterion set by the vigilance parameter. In FIG. 16, $$r_i^b = \frac{y_i^{a2} + y_i^{b2}}{\rho_3{}^a + ||y^{a2}|| + ||y^{b2}||}. \quad (44)$$

Reset occurs if $$||r^b|| < \rho^b, \quad (45)$$

where $$0 < \rho^b < 1. \quad (46)$$

As in equations (5) and (6), the effect of a large reset signal is approximated by setting input variables $x_i^{b1}, x_i^{b3}, x_j^{c1}, x_j^{c3}$ and bound transmitter variables $v_{ij}^{bc}, v_{ji}^{cb}$ equal to 0.

ITERATION STEPS

Steps 1–7 outline the iteration scheme in the computer program used to generate the simulations.
Step 1. $t \rightarrow t + \Delta t$.
Step 2. Set $\rho$ and $S_i^{\rho3}$ values.
Step 3. Computer $r_i^b$ and check for reset.
Step 4. Iterate STM equations $F_b$, $F_c$ five times setting variables to 0 at reset.
Step 5. Iterate transmitter equations (38)–(41).
Step 6. Computer sums $\Sigma_i v_{ij}^{bc}$ and $\Sigma_j v_{ji}^{cb}$.
Step 7. Return to Step 1.

While this invention has been particularly shown and described with reference to a preferred embodiment thereof, it will be understood by those skilled in the art that various changes in form and details may be made therein without departing from the spirit and scope of the invention as defined by the appended claims.

We claim:

1. A pattern recognition data processing system comprising:
   a short term feature representation field of nodes supporting signals derived from input signals defining an input pattern;
   a category representation field of a plurality of nodes representing pattern categories;
   means for selecting at least one category node of the category representation field based on a pattern from the short term feature representation field; and
   means for resetting a category selection to cause continued search for an acceptable category selection;
   wherein the means for selecting generates activation signals at nodes of the category representation field which are a function of signals from nodes of the feature representation field weighted by selection weights, the selection weights being initially set for a category selection search by long term memory but being reduced when selecting at least one category after reset of a category selection.

2. A pattern recognition system as claimed in claim 1 wherein said selection weights are reduced as a function of the at least one category which is selected.

3. A pattern recognition system as claimed in claim 1 wherein, in generating the activation signals, the signals from nodes from the feature representation field are further weighted by corresponding activation signals to contrast enhance category selection.

4. A pattern recognition system as claimed in claim 1 further comprising means for adapting initial selection weights set by long term memory to the input pattern.

5. A pattern recognition system as claimed in claim 1 further comprising means for generating a long term memory template, based on the selected category, to be matched against the input pattern.

6. A pattern recognition system as claimed in claim 1 further comprising means for adapting the long term memory template to the input signals.

7. A pattern recognition system as claimed in claim 1 wherein the category representation field comprises a plurality of subfields of nodes supporting short term signals and feedback of short term signals within the short term field, each of the short term signals of at least one subfield being based on signals specific to a category and also on nonspecific signals generated from across the short term field.

8. A pattern recognition system as claimed in claim 1 further comprising a second category representation field and means for selecting at least one category of the second category representation field based on pattern from the first category representation field.

9. A method of pattern recognition in a pattern recognition data processing system comprising:
   storing input signals defining an input pattern in a short term feature representation field of nodes;
   selecting at least one category node of a category representation field comprised of a plurality of nodes representing pattern categories based on a pattern from the short term feature representation field; and
   resetting a category selection;
   in selecting at least one category node, generating activation signals at nodes of the category representation field which are a function of signals from nodes of the feature representation field weighted by selection weights, the method further comprising initially setting the selection weights by long term memory and reducing the selection weights in selecting at least one category after reset of a category selection.

10. A method as claimed in claim 9 wherein the selection weights are reduced as a function of the at least one category which is selected.

11. A method as claimed in claim 9 further comprising, in generating the activation signals, weighting signals from nodes of the feature representation field by corresponding activation signals to contrast enhance category selection.

12. A method as claimed in claim 9 further comprising adapted initial selection weights set by long term memory to the input pattern.

13. A method as claimed in claim 9 further comprising generating a long term memory template, based on the selected category and matching the memory template against the input pattern to determine reset of a category selection.

14. A method as claimed in claim 9 further comprising adapting the long term memory template to the input signals.

15. A method as claimed in claim 9 further comprising, in the category representation field, supporting short term signals in a plurality of subfields and providing feedback of short term signals within the short term field, each of the short term signals of at least one subfield being based on signals specific to a category and also on nonspecific signals generated from across the short term field.

16. A method as claimed in claim 9 further comprising selecting at least one category of a second category representation field based on a pattern from the first category representation field.

17. A pattern recognition data processing system comprising:
a short term feature representation field of nodes supporting signals derived from input signals defining an input pattern and template signals defining a long term memory template;
means for selecting at least one category of a category representation field of nodes based on a pattern from the short term feature representation field;
means for generating the long term template based on the at least one selected category; and
means for adapting category selection and the long term memory template to the input signals;
the category representation field comprising a plurality of subfields of nodes supporting short term signals and feedback of short term signals within the category representation.

18. A pattern recognition system as claimed in claim 17 wherein at least one category is selected based on a pattern from the short term feature representation field weighted by selection weights, the system further comprising means for resetting a category selection, the selection weights being initially set by long term memory but being reduced, as a function of at least one category which is selected, in selecting at least one category after reset of a category selection.

19. A pattern recognition system as claimed in claim 17 wherein, in generating the activation signals, the signal from nodes from the feature representation field are further weighted by corresponding activation signals to contrast enhance category selection.

20. A category selection system as claimed in claim 17 wherein each of the short term signals of at least one subfield is based on signals specific to a category and also on nonspecific signals generated from across the short term field.

21. A pattern recognition system as claimed in claim 17 further comprising a second category representation field, and means for selecting at least one category of the second category representation field based on a pattern from the first category representation field.

22. A method of pattern recognition in a pattern recognition data processing system comprising storing input signals in a short term representation field of nodes;
selecting at least one category of a category representation field comprised of a plurality of nodes representing pattern categories based on a pattern from the short term feature representation field;
generating a long term template based on the at least one selected category; and
adapting category selection and the long term memory template to the input signals;
the method further comprising, in the category representation field, generating short term signals in a plurality of subfields and providing feedback of short term signals within the category representation field.

23. A method as claimed in claim 22 further comprising selecting the at least one category based on a pattern from the short term feature representation field weighted by selection weights, and resetting the category selection with an insufficient match between the long term template and the input pattern in the feature representation field, the method further comprising initially setting the selection weights by long term memory but reducing the selection weights, as a function of at least one category which is selected, in selecting at least one category after reset of a category selection.

24. A method as claimed in claim 22 further comprising generating activation signals at nodes of the category representation field which are a function of signals from nodes of the feature representation field weighted by selection weights, the method further comprising further weighting signals from nodes from the feature representation field by corresponding activation signals to contrast enhance category selection.

25. A method as claimed in claim 22 wherein each of the short term signals of at least one subfield is based on signals specific to a category and also on nonspecific signals generated from across the short term field.

26. A method as claimed in claim 22 further comprising selecting at least one category of a second category representation field based on a pattern from the first category representation field.

* * * * *

UNITED STATES PATENT AND TRADEMARK OFFICE
CERTIFICATE OF CORRECTION

PATENT NO. : 5,311,601
DATED : May 10, 1994
INVENTOR(S) : Gail A. Carpenter and Stephen Grossberg It is certified that error appears in the above-indentified patent and that said Letters Patent is hereby corrected as shown below:

In column 1, line 11, after "IRI-87-16960)," insert --and the Department of the Navy, Grant N00014-91-J-4100--.

Signed and Sealed this

Thirty-first Day of December, 1996

Attest:

BRUCE LEHMAN

*Attesting Officer*  *Commissioner of Patents and Trademarks*